(12) United States Patent
Speasl et al.

(10) Patent No.: US 11,468,198 B2
(45) Date of Patent: Oct. 11, 2022

(54) SECURE DIGITAL MEDIA AUTHENTICATION AND ANALYSIS

(71) Applicant: ImageKeeper LLC, Las Vegas, NV (US)

(72) Inventors: Jerry Speasl, Las Vegas, NV (US); Michael Patterson, Sherman, TX (US); Marc Roberts, St. Louis, MO (US)

(73) Assignee: ImageKeeper LLC, Las Vegas, NV (US)

( * ) Notice: Subject to any disclaimer, the term of this patent is extended or adjusted under 35 U.S.C. 154(b) by 271 days.

(21) Appl. No.: 16/837,944

(22) Filed: Apr. 1, 2020

(65) Prior Publication Data

US 2021/0312561 A1 Oct. 7, 2021

(51) Int. Cl.
| | |
|---|---|
| *H04L 29/06* | (2006.01) |
| *G06F 21/64* | (2013.01) |
| *G06Q 40/08* | (2012.01) |
| *H04L 9/06* | (2006.01) |
| *H04L 9/30* | (2006.01) |
| *G06F 21/60* | (2013.01) |
| *H04L 9/32* | (2006.01) |

(52) U.S. Cl.
CPC ............ *G06F 21/64* (2013.01); *G06F 21/602* (2013.01); *G06Q 40/08* (2013.01); *H04L 9/0643* (2013.01); *H04L 9/30* (2013.01); *H04L 9/3239* (2013.01); *H04L 9/3247* (2013.01)

(58) Field of Classification Search
CPC ....... G06Q 40/08; G06F 21/602; G06F 21/64; G06F 21/645; H04L 9/0643; H04L 9/30; H04L 9/3239; H04L 9/3247; H04L 2209/38; H04L 63/123

See application file for complete search history.

(56) References Cited

U.S. PATENT DOCUMENTS

| | | |
|---|---|---|
| 4,876,597 A | 10/1989 | Roy et al. |
| 5,343,527 A | 8/1994 | Moore |
| 5,553,609 A | 9/1996 | Chen et al. |
| 5,737,491 A | 4/1998 | Allen et al. |

(Continued)

FOREIGN PATENT DOCUMENTS

| | | | |
|---|---|---|---|
| CN | 108040050 A | * 5/2018 | ........... G06F 21/602 |
| CN | 110866224 A | * 3/2020 | |

(Continued)

OTHER PUBLICATIONS

U.S. Appl. No. 15/051,569, Jerry Speasl, Property Measurement with Automated Document Production, filed Feb. 23, 2016.

(Continued)

*Primary Examiner* — Sher A Khan
(74) *Attorney, Agent, or Firm* — Polsinelli LLP

(57) ABSTRACT

A server system for digital media processing may receive two digital media assets and information associated with capture of the two digital media assets, such as metadata or sensor data from the respective times of capture of the two digital media assets. The server system verifies that the two digital media assets and associated information are unaltered, and that the second of the two digital media assets is captured after the first. The server system then generates a document that incorporates the two digital media assets, such as an insurance claim document.

18 Claims, 14 Drawing Sheets

(56) References Cited

U.S. PATENT DOCUMENTS

| | | | |
|---|---|---|---|
| 6,038,295 A | 3/2000 | Mattes | |
| 6,122,526 A | 9/2000 | Parulski et al. | |
| 6,182,219 B1 | 1/2001 | Feldbau et al. | |
| 6,256,059 B1 | 7/2001 | Fichtner | |
| 6,278,466 B1 | 8/2001 | Chen et al. | |
| 6,304,211 B1 | 10/2001 | Boman | |
| 6,370,568 B1 | 4/2002 | Garfinkle | |
| 6,584,564 B2 | 6/2003 | Olkin et al. | |
| 6,662,226 B1 | 12/2003 | Wang et al. | |
| 6,751,454 B2 | 6/2004 | Thornton | |
| 6,784,925 B1 | 8/2004 | Tomat et al. | |
| 6,847,334 B2 | 1/2005 | Hayhurst et al. | |
| 6,995,789 B2 | 2/2006 | Mcintyre et al. | |
| 7,028,184 B2 | 4/2006 | Hind et al. | |
| 7,034,880 B1 | 4/2006 | Endsley et al. | |
| 7,170,551 B2 | 1/2007 | Fichtner | |
| 7,188,307 B2 | 3/2007 | Ohsawa | |
| 7,239,346 B1 | 7/2007 | Priddy | |
| 7,343,049 B2 | 3/2008 | Bulterworth | |
| 7,526,718 B2 | 4/2009 | Samadani et al. | |
| 8,224,178 B2 | 7/2012 | Keane | |
| 8,634,712 B1 | 1/2014 | Mullins | |
| 9,094,543 B2 | 4/2015 | Mullins | |
| 9,538,336 B2 | 1/2017 | Rudow et al. | |
| 10,048,378 B2 | 8/2018 | Gogolla et al. | |
| 10,101,465 B2 | 10/2018 | Loomis et al. | |
| 10,282,562 B1 | 5/2019 | Speasl | |
| 10,318,110 B2 | 6/2019 | Naaman et al. | |
| 10,360,705 B2 | 7/2019 | Cervelli et al. | |
| 10,444,941 B2 | 10/2019 | Cervelli et al. | |
| RE48,867 E | 12/2021 | Schneider | |
| 11,212,416 B2 | 12/2021 | Speasl | |
| 11,227,070 B2 | 1/2022 | Speasl | |
| 2002/0108118 A1 | 8/2002 | Cohen et al. | |
| 2002/0122568 A1 | 9/2002 | Zhao | |
| 2002/0147618 A1 | 10/2002 | Mezrah et al. | |
| 2002/0186412 A1 | 12/2002 | Murashita | |
| 2003/0085989 A1 | 5/2003 | Tay | |
| 2004/0012811 A1 | 1/2004 | Nakayama | |
| 2004/0174434 A1 | 9/2004 | Walker et al. | |
| 2004/0217884 A1* | 11/2004 | Samadani | G01C 7/00 340/995.14 |
| 2004/0218894 A1 | 11/2004 | Harville et al. | |
| 2004/0218895 A1 | 11/2004 | Samadani et al. | |
| 2004/0218910 A1 | 11/2004 | Chang et al. | |
| 2004/0221227 A1 | 11/2004 | Wu | |
| 2004/0264542 A1 | 12/2004 | Kientz | |
| 2005/0036034 A1 | 2/2005 | Rea et al. | |
| 2005/0062851 A1 | 5/2005 | Silverbrook et al. | |
| 2005/0110880 A1 | 5/2005 | Parulski et al. | |
| 2005/0114459 A1 | 5/2005 | Tu et al. | |
| 2006/0105806 A1 | 5/2006 | Vance et al. | |
| 2006/0114338 A1* | 6/2006 | Rothschild | G06F 16/58 386/E5.072 |
| 2006/0248348 A1 | 11/2006 | Wakao et al. | |
| 2007/0008321 A1 | 1/2007 | Gallagher et al. | |
| 2007/0063033 A1 | 3/2007 | Silverbrook et al. | |
| 2007/0073937 A1 | 3/2007 | Feinberg et al. | |
| 2007/0074035 A1* | 3/2007 | Scanlon | H04K 1/00 713/176 |
| 2008/0219658 A1 | 9/2008 | Keane et al. | |
| 2008/0305856 A1* | 12/2008 | Walker | G07F 17/3269 463/20 |
| 2009/0031425 A1 | 1/2009 | Basson et al. | |
| 2011/0137561 A1 | 6/2011 | Kankainen | |
| 2011/0235923 A1* | 9/2011 | Weisenburger | G06T 7/73 382/201 |
| 2011/0276423 A1* | 11/2011 | Davidson | H04N 21/44016 705/26.1 |
| 2012/0086971 A1 | 4/2012 | Bisbee et al. | |
| 2013/0046461 A1 | 2/2013 | Balloga | |
| 2013/0080051 A1 | 3/2013 | Gribkov et al. | |
| 2014/0049653 A1 | 2/2014 | Leonard et al. | |
| 2014/0114691 A1 | 4/2014 | Pearce | |
| 2014/0125822 A1 | 5/2014 | Mullins | |
| 2014/0152854 A1 | 6/2014 | Iwaki et al. | |
| 2014/0176733 A1 | 6/2014 | Drooker et al. | |
| 2014/0281520 A1 | 9/2014 | Selgas et al. | |
| 2014/0304184 A1 | 10/2014 | Fletcher | |
| 2015/0098021 A1* | 4/2015 | O'Sullivan | H04N 21/4223 348/516 |
| 2015/0312227 A1 | 10/2015 | Follis et al. | |
| 2015/0334257 A1* | 11/2015 | Woods | H04N 1/00307 348/207.1 |
| 2016/0042767 A1 | 2/2016 | Araya et al. | |
| 2016/0138919 A1 | 5/2016 | Green et al. | |
| 2016/0169856 A1 | 6/2016 | Sung | |
| 2016/0210734 A1 | 7/2016 | Kass et al. | |
| 2017/0140492 A1 | 5/2017 | Leonard et al. | |
| 2018/0357632 A1 | 12/2018 | Jammikunta et al. | |
| 2019/0325164 A1 | 10/2019 | Speasl | |
| 2020/0014816 A1 | 1/2020 | Speasl | |
| 2020/0151363 A1 | 5/2020 | Speasl | |
| 2020/0184465 A1 | 6/2020 | Kislev et al. | |
| 2020/0403796 A1 | 12/2020 | Sapena Solar | |
| 2021/0400161 A1 | 12/2021 | Alrahaili | |
| 2022/0004666 A1 | 1/2022 | Speasl | |
| 2022/0070330 A1 | 3/2022 | Speasl | |
| 2022/0116511 A1 | 4/2022 | Speasl | |

FOREIGN PATENT DOCUMENTS

| | | | | |
|---|---|---|---|---|
| CN | 109460732 B | * | 11/2020 | ......... G06K 9/00664 |
| WO | WO 2020/010355 | | 1/2020 | |

OTHER PUBLICATIONS

U.S. Appl. No. 17/556,071, Jerry Speasl, Secure Digital Media Capture and Analysis, filed Dec. 20, 2021.
U.S. Appl. No. 17/008,568, Jerry Speasl, Secure Document Certification and Execution System, filed Aug. 31, 2020.
PCT Application No. PCT/US2019/040852 International Preliminary Report on Patentability dated Jan. 12, 2021.
PCT Application No. PCT/US2019/040852 International Search Report and Written Opinion dated Oct. 22, 2019.
U.S. Appl. No. 15/051,569 Office Action dated Aug. 27, 2021.
U.S. Appl. No. 15/051,569 Final Office Action dated Oct. 20, 2020.
U.S. Appl. No. 15/051,569 Office Action dated Apr. 29, 2020.
U.S. Appl. No. 15/051,569 Final Office Action dated Aug. 14, 2019.
U.S. Appl. No. 15/051,569 Office Action dated Feb. 8, 2019.
U.S. Appl. No. 15/052,774 Final Office Action dated Jun. 1, 2018.
U.S. Appl. No. 15/052,774 Office Action dated Aug. 7, 2017.
U.S. Appl. No. 16/399,785 Final Office Action dated Nov. 6, 2020.
U.S. Appl. No. 16/399,785 Office Action dated Aug. 9, 2019.
U.S. Appl. No. 16/741,605 Final Office Action dated Jul. 24, 2020.
U.S. Appl. No. 16/741,605 Office Action dated Mar. 20, 2020.
U.S. Appl. No. 17/162,629 Office Action dated Oct. 18, 2021.
U.S. Appl. No. 11/715,049 Office Action dated Dec. 14, 2011.
U.S. Appl. No. 11/715,049 Final Office Action dated Jul. 8, 2011.
U.S. Appl. No. 11/715,049 Office Action dated Jun. 12, 2009.
U.S. Appl. No. 13/491,026 Office Action dated Mar. 5, 2013.
U.S. Appl. No. 14/154,156 Office Action dated Feb. 28, 2014.
U.S. Appl. No. 14/809,068 Office Action dated Dec. 18, 2015.
U.S. Appl. No. 16/505,305 Office Action dated Mar. 3, 2021.
U.S. Appl. No. 16/505,305 Final Office Action dated Nov. 17, 2020.
U.S. Appl. No. 16/505,305 Office Action dated Jul. 22, 2020.
U.S. Appl. No. 15/051,569 Final Office Action dated Mar. 2, 2022.
U.S. Appl. No. 17/008,568 Office Action dated Mar. 9, 2022.

* cited by examiner

FIG. 3

Functions/Features 300 in Intelligent Media Capture System 310

| | | | |
|---|---|---|---|
| Calculate Image Object A, B, C; Single or Multiple Objects | Distance to/from Object | Apply real-time kinematics (RTK), real-time network (RTN) | Interface to World Geodetic Datum (WGD) |
| Position | Elevation, Angle | Cell Triangulation | Apply custom note, type, voice to text, other |
| Time | Position in X, Y, Z | Satellite Map Location - Map, Street view, enter name, place, event, add images, video, audio, any resolution | Apply marker to image objects |
| Altitude | Location GPS + X, Y, Z | Show Map Pointer on map, satellite or both on map; Show A, B, C object on map, bearing, distance, angle, XYZ with azimuth + true north | Data Logging |
| Attitude | Apply GPS differential corrections | Create team share with data, Exchange location tracking with others in real time | Add to existing files |
| Telescope | 3-Axis Location, Position, Distance X, Y, Z of imaged object | Roll, Pitch, Yaw; Digital Data Capture Device; Relationship with Object in Image | Transmission to multiple servers – internet, cell service wireless, RF, private services |

SECURE DIGITAL MEDIA AUTHENTICATION AND ANALYSIS

BACKGROUND

Field of the Invention

The present invention generally relates to digital media processing. More specifically, the present technology relates to authentication, validation, and analysis of digital media, and generation of documentation using the digital media that may be used for insurance processes.

Description of the Related Art

User devices such as smartphones or tablets can capture photos or videos using camera software applications designed to interact with camera hardware embedded in the user device. Some of these camera applications store photo metadata along with the photo. However, viewers viewing photos or videos captured using such software applications traditionally have no way to know if the photos or videos and associated metadata are genuine, or if the photos or videos have been altered or manipulated in some way. This can be particularly problematic if such photos or videos are used in contexts such as the insurance industry, as manipulated photos, videos, or metadata could be used by malicious parties for fraudulent insurance claims. Thus, there is a need for improved techniques and technologies that combat digital media and metadata manipulation.

SUMMARY

System and methods for secure media processing are disclosed. In one example, a method is provided that includes receiving a first digital media receiving a first digital media asset, a first information set associated with the first digital media asset, a second digital media asset, and a second information set associated with the second digital media asset. The method also includes verifying that the first digital media asset and the first information set are unaltered and verifying that the second digital media asset and the second information set are unaltered. The method also includes verifying that a first time of capture of the first digital media asset as identified in the first information set is before a second time of capture of the second digital media asset as identified in the second information set. The method also includes generating a document that includes the first digital media asset and the second digital media asset in response to verifying that the first time of capture is before the second time of capture and to verifying that the first digital media asset, the first information set, the second digital media asset, and the second information set are unaltered.

BRIEF DESCRIPTION OF THE DRAWINGS

FIG. 3 illustrates exemplary functions and features of the image capture system.

DETAILED DESCRIPTION

Techniques for secure media processing may be used to certify a digital media asset by verifying that the digital media asset is authentic and has not been altered since capture. In some cases, these secure media processing techniques may be used in the context of an enterprise ecosystem including a mobile application and a corresponding server system. Together the mobile application and the corresponding server system automatically generate quotes or identify insurance policies for users based on certified digital media depicting an object to be insured, and automatically generates and handles insurance claims based on additional certified digital media depicting the insured object after an event occurs that, for instance, causes the object to incur damage.

The mobile application and corresponding server system can perform tasks of various types, including marketing, communications, selling, underwriting, providing digital copies of an insurance policy, binding (e.g., including through electronic signatures), payment transaction of an insurance policy, insurance claim loss notices, analytics, adjustment processes, to final payment and delivery of insurance claim damages. The mobile application covers capturing, processing, and certifying a digital media asset submitted for insurance purposes. Through these techniques, fraud is reduced in the insurance claim process due to the certification of digital media asset. An artificial intelligent object recognition system and third-party databases may be utilized to determine the identity, condition, replacement cost and value of the property, and verify the validity of the insurance claim. Data transferred between the parties in the system are transmitted to a secure server and are securely accessible by the parties involved to provide transparency in the insurance process.

The mobile application and corresponding server system may generate and/or identify an insurance policy, and perform other tasks related to the insurance policy, such as underwriting, filing an insurance claim, analyzing the insurance claim, adjustment process and processing of the final payment of insurance claim damage along with policy renewals. Examples of types of insurance the mobile application and corresponding server system may be used for but not limited to are: homeowners, business, auto, condo, commercial business, ID theft, motorcycle, pet, RV, renters, travel, jewelry, boat, flood, hurricane, marine ships and shipping, tornado, hail, wind, aviation, agriculture, earthquake, fire, and property and casualty insurance.

Figure 1:
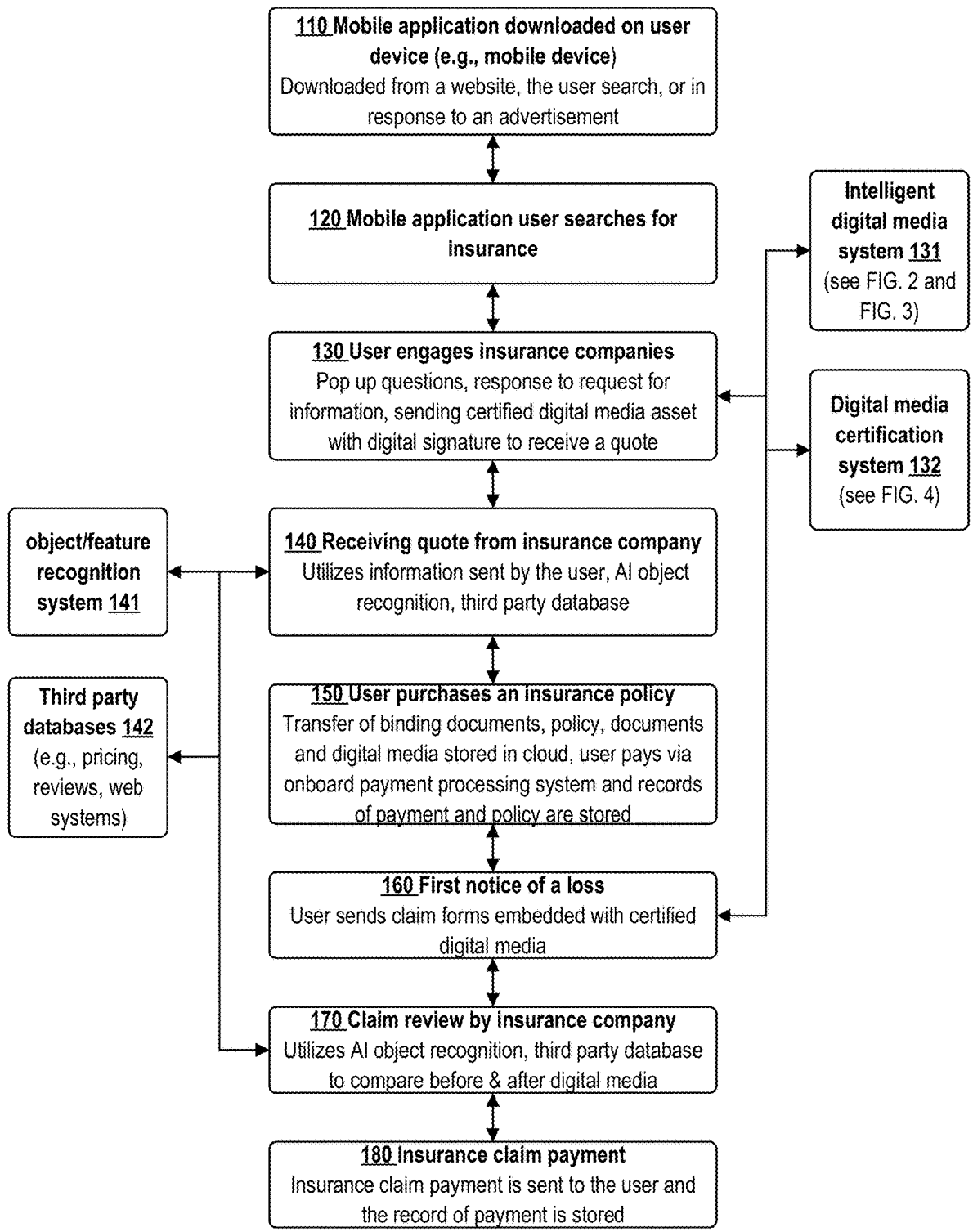
FIG. 1 is a flow diagram illustrating operations of an image capture and certification system combined with an end to end mobile insurance system.

FIG. 1 is a flow diagram illustrating operations of an image capture and certification system combined with an end to end mobile insurance system.

At step 110, a mobile application is downloaded on the user's mobile device. The mobile application may be downloaded from a website or other storage repository through the user search, or by clicking on an advertisement that was sent to the user from a website, email, or messages. A mobile application is utilized in the lifecycle of obtaining insurance and filing an insurance claim. The mobile application may contain marketing tools, ability to send and receive documents, tools to capture, certify, and organize digital media, automatically attach the digital media to the insurance documents, incorporate electronic signatures, and notary credentials, and to review the policies and insurance claim process.

The mobile application may be installed on any mobile device equipped with various sensors such as one or more cameras, video, audio recording microphones, GPS or GNSS receivers, any other types of sensors discussed herein, or some combination thereof. Such a device may be a smart phone, a tablet computer, a personal digital assistant (PDA), drones, UGV, pocket PC, satellite camera equipped phone, or a laptop. The mobile device can connect to internet via Wi-Fi or wired connection or communicate with a cellular tower. The mobile application may be downloaded on the mobile device via the cellular or internet connection, from an advertisement with a QR code, website, Apple/Google app store, or directly searching for the application.

A touchscreen display of the mobile device may display a graphical user interface (GUI) to assist a user seeking to obtain an insurance in utilizing the mobile application. The GUI may contain various menu screens and menu buttons for the user to interact with. The GUI may provide a search bar to search for an insurance company and the company's history, rates, and customer reviews. The GUI may also provide an option to search insurance companies by price, reviews, or products the companies provide.

At step 120, the user searches for an insurance company and the insurance policies from the GUI of the mobile device using the mobile application. The user may view information regarding the policies and the insurance companies on the mobile application. The application may query the user for basic questions to assist the user in narrowing the options for the user. To receive further information and the personalized quote, the user sends information relevant to the user and the property to be insured to the insurance company at step 130. The mobile application and corresponding server system may assist in downloading and uploading various documents needed to obtain a quote. A menu option may present the user with links to various documents the user needs such that the documents may be downloaded to the mobile device. Another menu option may be presented to upload a document from the device memory. The menu option may be personalized for different insurance company the user is seeking insurance from.

A digital media asset, which may include an image, video, audio, map, satellite photo, or some combination thereof, may also be uploaded via the application. The user utilizes intelligent digital media capture system 131 and the digital media certification system 132 when sending the certified digital media to the insurance company to receive a quote. At step 131, the user may take one or more digital images or videos of the property to be insured to document and verify the identity, value, and the quality of the property for the purpose of obtaining a quote for the insurance and for the underwriting department to evaluate the property in the original state. Sensor data, such as the GPS coordinates where the digital media was taken, may be retrieved along with the digital media asset at the time of the capture. Metadata related to the digital media asset, such as the author, date and time of the capture, description, media title, names of individuals involved, may also be retrieved. The sensor data and metadata may be used to verify the assertion made by the user. For example, for a house insurance, the GPS coordinates attached with the digital media asset support the assertion that the house is located where the user asserts is the location of the house.

At step 132, the digital media asset may be certified by generating a hash digest of the digital media and encrypting the digital media and its hash value. The certified digital media asset guarantees that the digital media is unaltered and authentic. The encryption may include generating an asymmetric public key infrastructure key pair as further illustrated in FIG. 6. Hash values of sensor data and the metadata of the digital media asset may similarly be generated and encrypted. The system may generate an information page based on the information associated with the digital media asset and stores the information page at a network location. The server system may also generate an interactive glyph, such as a QR code, that encodes information pointing to the network location. The server system generates a modified digital media asset by overlaying or otherwise embedding the glyph onto the digital media asset. The server system outputs the modified digital media asset, for example by printing the modified digital media asset or transmitting the modified digital media asset to a display device that displays the modified digital media asset. A requesting device scans the glyph from the modified digital media asset, for example using a camera, and decodes from the glyph the information pointing to the network location. Once the requesting device decodes the information pointing to the network location, the requesting device requests the information page from the server system. The server system serves the information page to the requesting device. In some cases, the requesting device transmits communications to the server system, for example to leave a comment regarding the digital media asset, to indicate approval or disapproval of the digital media asset, or to edit the digital media asset. The server system receives the communication and modifies the information page to reflect comments, approvals, disapprovals, or edits.

At step 140, the system utilizes AI object recognition 141 and third-party database 142 to verify the information and assess the property to assist in obtaining a quote for the user. An artificial intelligent (AI) processor 141 may be used to determine the identity, value, age, condition, type, and scope of the property. For example, the AI may recognize from the shape, pixel information, and the curvature of the lines that the digital image or a video is of a blue car and the car has dents and other imperfections.

A third-party database 142 may be utilized in identifying and evaluating the property captured in the digital media. The system may search and connect to an appropriate third-party database automatically or an appraiser, an underwriter, or an adjuster may search for a third-party database manually. For example, the AI may recognize that the digital media is an image of a Honda vehicle from the "H" of the front grill emblem and search the certified Honda database for the model and the year of the car. From the license plate of the vehicle, the AI may also obtain history, ownership, and registration information of the car from a database containing the history of the vehicle. From the information of the make, model, year, history, and the condition of the car, the AI may search for a database with prices of cars of similar condition to determine the value of the car. In another example, the AI may recognize a digital media of a house and determine the address of the house and the date the image was taken from the sensor and the metadata of the digital media. The AI then may search the appropriate databases to obtain tax records, improvements records to determine the value of the house. A human may assist with the AI by specifying that the image is a car so that the server system may search for an appropriate third-party database.

Another third-party database may be utilized in comparing pricing of similar policies between insurance companies. A third-party database containing consumer opinions or reviews may also be utilized and displayed for the user.

At step 150, the user accepts a policy and the system transfers insurance documents and payment for the insurance policy between the user and the insurance company. The mobile application and corresponding server system may facilitate payments between the user and the insurance company. For example, once the customer chooses a policy from an insurance company, the mobile device may transmit the payment information of the user to the insurance company by allowing the user to input the credit card information on the GUI of the mobile application. The server system allows the user to transmit electronic signature to bind the user. The mobile application and corresponding server system may also generate a certified insurance card once the policy is granted to the user. When the insurance company issues the insurance card to the user, the insurance card may be retrieved, downloaded, stored, and viewed from the mobile application. Using asymmetrical encryption and a hash generator similar to certifying a digital media asset above, the image of the insurance card may be certified such that the image is guaranteed to be authentic.

When an event arising to filing of an insurance claim occurs, the user may send the insurance claim form embedded with certified digital media at step 160. The mobile application and corresponding server system may assist in the user filing an insurance claim in response to a loss in regards to the insured property. The mobile application allows the user to file an insurance claim by downloading the insurance claim form to the mobile device from the application, taking a certified digital media, and automatically populate the insurance document with the digital media. Similar to when the user uploads digital media to obtain a quote, the system generates a certified image by receiving digital media asset from the mobile device of the user, generating the hash values for the digital media and the sensor and metadata, encrypting the hash values, and overlaying a glyph on the digital media. The system may search for the certified digital media used at the time the user applied for the insurance to automatically attach the digital media to the insurance claim form. The insurance claim form containing certified media is then transferred to a secure server for the insurance claim adjuster to investigate the insurance claim. The user may also send other supporting documents to the insurance claim, such as estimates of financial loss, engineering reports, and police reports from the mobile application.

Figure 8:
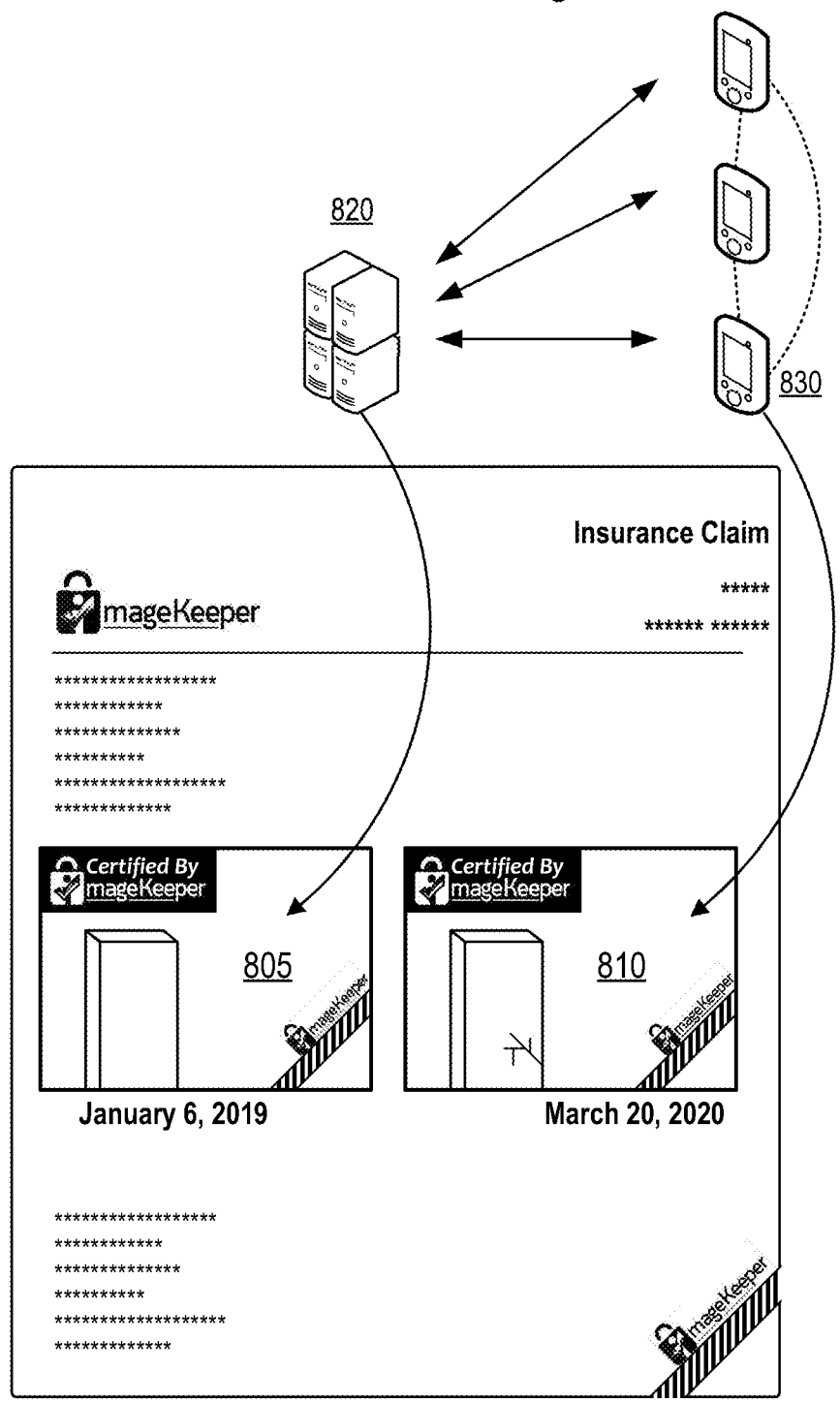
FIG. 8 illustrates a document including two certified digital media assets corresponding to different capture times.

In assessing the validity of the insurance claim, an AI/ML object recognition system and third-party database may be used to verify the authenticity of the certified digital media submitted at the time the insurance quote was obtained with the certified digital media submitted at the time the insurance claim was filed as discussed with respect to FIG. 8. The insurance claim is reviewed by the insurance company at step 170. The insurance claim adjuster or any other individuals relevant to assessing the insurance claim may obtain access to the information that the user submitted, such as the insurance claim form and the certified digital media. The insurance claim adjuster or any other relevant individuals may also upload certified digital media or other documents to the cloud, such as digital media of damages the insurance claim adjuster personally inspected, video or audio of witness interviews, or other documents that the adjuster or other individuals submitted. The documents and the certified digital media may be viewable by all relevant individuals given access within the system. Furthermore, the user who filed the insurance claim may be allowed to view the status of the insurance claim via claim status indicator from the mobile application. As documents and digital media are added and the insurance claim adjuster makes progress with the insurance claim, the user is allowed to view and receive updates regarding the insurance claim.

The mobile application and corresponding server system may utilize the sensor and metadata of the digital image to verify the validity of the insurance claim. In a car accident insurance claim, the system may verify the location of the car accident from the GPS coordinates in the sensor data of the digital media. For a house that is insured, the system may determine whether the two sets of digital media, one from before the insurance claim and one after the insurance claim was made, are taken in the same property based on the sensor and metadata of the digital media.

The mobile application and corresponding server system may utilize artificial intelligence (AI) and/or machine learning (ML) image recognition, object recognition, and/or feature recognition algorithms to compare the set of digital media assets obtained at the time of the quote with the set of digital media asset obtained at the time the insurance claim is made. For example, the recognition algorithms may determine the locations and the extent of the damage of the insured car by comparing the digital images of the car before and after the accident. The system may also utilize third-party database to determine the validity of the insurance claim. For an insurance claim asserting flood damage to a house, the system may obtain the metadata and the sensor data from the digital media of a house to determine the location and the date the digital image was taken. From this information, the AI may search for a third-party database for the weather data of the location of the property to determine the validity of the insurance claim that there was a flood. At any point, a human assessor may assist with the recognition algorithms in narrowing the search fields, by specifying the terms for the search, or by correcting the recognition algorithms.

Once the insurance claim assessment is complete and the user is entitled to payment from the insurance company, the insurance claim funds may be transferred to the user's financial institution or via selectable modes by the user of the mobile application at step 180. The system can utilize the bank account information or a third-party payment system in order to transfer the funds between parties. According to the user preference, FedEx or other carriers may be utilized by the system instead of wired transfer. The mobile system spans the efforts from marketing, selling, underwriting, binding a policy, insurance claim loss notices, analytics, records, cost estimates, in and out of app communication records, adjustment processes, to final payment of the insurance claim damage. The system incorporates capturing, processing, and certifying a digital media asset submitted for insurance purposes to reduce fraudulent insurance claims. An artificial intelligent object recognition system and third-party databases may be utilized to determine the identity, condition, and value of the property, and verify the validity of the insurance claim. Data transferred between the parties in the system are transmitted to a secure server and are accessible by the parties involved to provide transparency in the insurance process.

Figure 2:
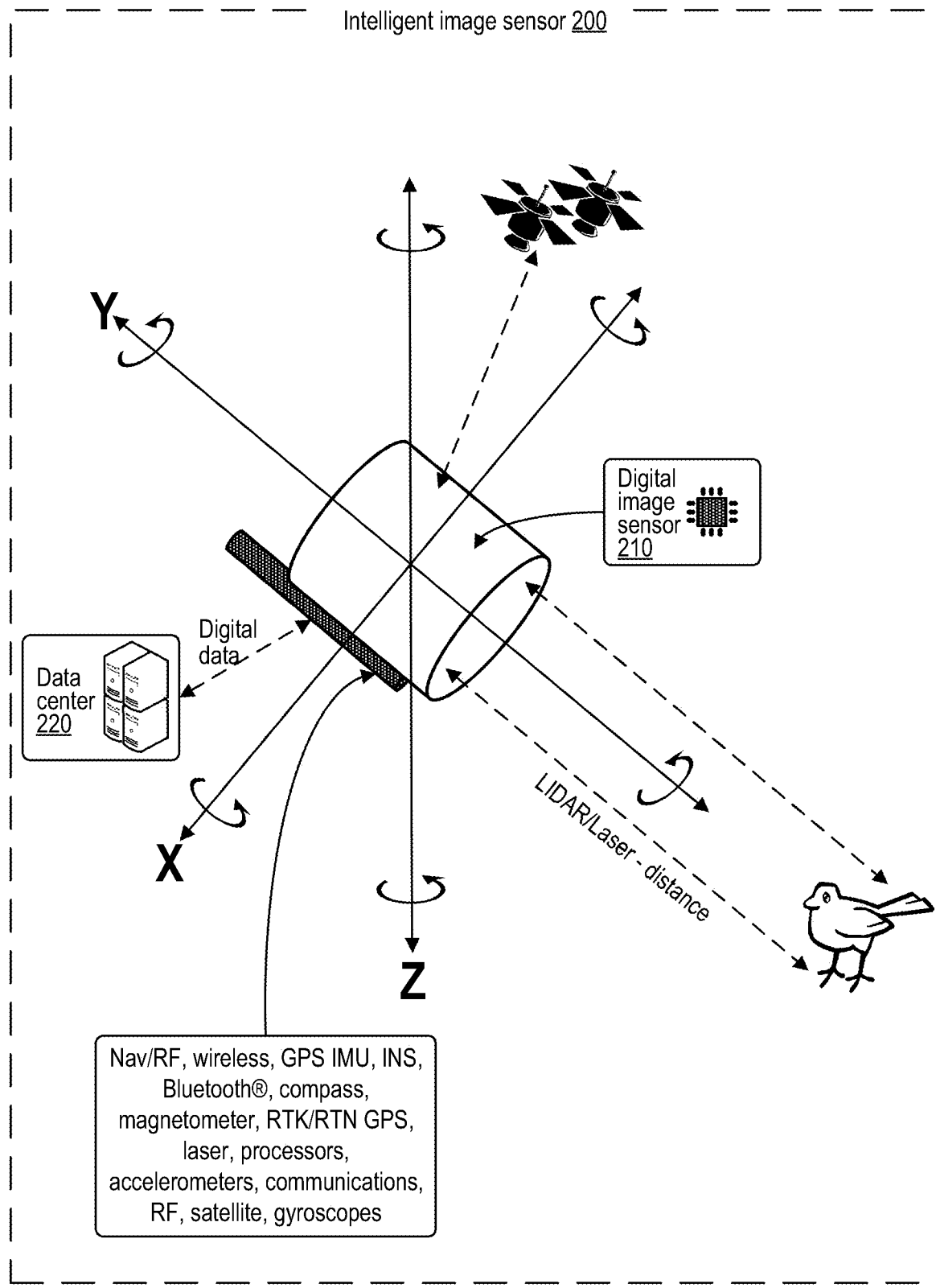
FIG. 2 illustrates an image capture system that combines a camera image with a sensor data set from a sensor system.

FIG. 2 illustrates a digital media capture system that combines a camera image with a sensor data set from a sensor system.

The camera image is taken using a camera embedded as a part of an image capture device with an intelligent image sensor 200 that includes a digital image sensor 210 as well as a number of sensors, such as one or more laser rangefinders, LIDAR sensors, inertial measurement units (IMUs), magnetometers, GPS receivers, GNSS receivers, accelerometers, gyroscopes, other sensors discussed herein, or some combination thereof. This device can be a camera such as a digital or analog point-and-shoot camera, a digital or analog single-lens reflex "SLR" camera, a digital or analog image-capturing telescope, a digital or analog image-capturing microscope, commercial system used by DMV, badge systems, or a digital or analog camcorder. Consumer electronic devices with imaging componentry may also be used. For example, the user device can be a portable consumer user device such as a smartphone, a tablet device, a laptop computer, a wearable device, a portable gaming console, or a portable media player device. Less mobile devices may also be used such as desktop computers, television systems, gaming consoles, and various types of conveyances.

The image capture system is an example of a digital media capture device. A digital media capture device may capture images as discussed with respect to the image capture system. Images captured by the digital media capture device may include still images and/or one or more frames from a video. The digital media capture device may capture audio via a microphone. The digital media capture system may capture various sensor measurements from various sensors that may be part of, or coupled to, the digital media capture device.

The metadata captured by the media capture system can include, for example, the exact location in latitude, longitude, camera heading, and elevation of the image capture device. Captured information may further or alternatively include the roll of the image capture device, the pitch of the image capture device, the yaw of the image capture device, the velocity and/or direction of the image capture device, the viewing angle of the image capture device, the azimuth and/or compass bearing of the image capture device. Information concerning the horizon angles of the image capture device and the inclination and declination of the image capture device may likewise be collected. Such metadata can be attached to both images and video.

The digital data organization process of the image capture system may be controlled manually by a user or automatically by computer hardware/software control processes or mobile app. These may include organization by photos, video, audio, location, position, by image capture device, by user, by date, time, logged user, subscription user, or a number of other attributes of an image/video/audio/media file. Likewise, these images may be made searchable via these attributes in a network based (including "cloud based") storage system as well as a local storage system. In some embodiments, the captured image/video/media can also be stored and organized by facial recognition means and subsequently searched or made searchable by facial recognition applications.

FIG. 3 illustrates exemplary functions and features of the image capture system.

The media capture system 300 may include the three-dimensional intelligent image sensor 200 of FIG. 2, with internally embedded individual functions and/or features 300 for providing navigation, gyroscopic, processor, and communication technology. These various functionalities, which may be implemented through software, hardware, or a combination of the two, collect incident, event, and item images with sensor data.

As noted above, such information may include but is not limited to elevation, inclination, roll, pitch, yaw and bearing information. Other types of information might include position, time, altitude, zoom/telescope information, distance to/from a pictured object, object measurement in image or video, elevation angles, centimeter accurate XYZ position, global positioning system (GPS) coordinates, GPS differential corrections, 3-axis positions of an object in the image, real-time kinematics (RTK) sensor data, real-time network (RTN) survey data, cell triangulation data, satellite map location data, street view map location data, map pointer data, map compass data, roll/pitch/yaw data, and world geodetic system (WGS) or world geodetic datum (WGD) data. This collected information may also include custom notes, text, or recordings as well as custom image markers, logged data, object location attachments, or pointers to additional files.

Figure 4:
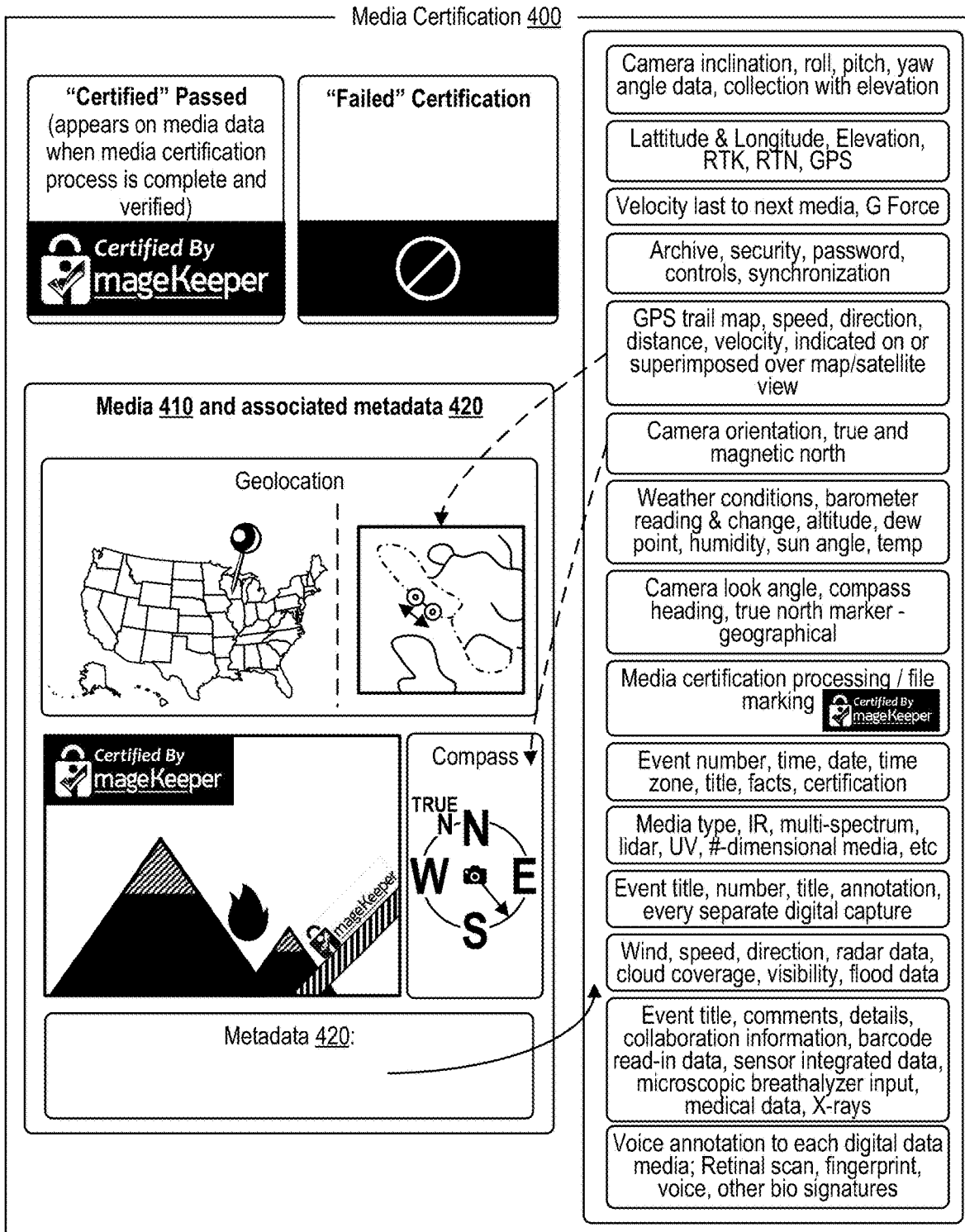
FIG. 4 identifies exemplary media metadata and certification data.

FIG. 4 identifies exemplary media metadata and certification data.

The media certification system 400 can be used to certify media 410 (e.g., images, videos, audio, or some combination thereof), metadata 420, and sensor data recorded by the image capture device. A certified media asset is one whose media data 410, metadata 420 corresponding to a time of capture of the media, and sensor data corresponding to a time of capture of the media have been ensured to be authentic and unaltered via certification (e.g., according to the process 600 of FIG. 6). In some cases, the sensor data may be considered part of the metadata 420, part of the media 410, or both. In some cases, the metadata 420 may be considered part of the sensor data, the media data 410, or both.

The media certification system 400 of FIG. 4 can certify the media asset 410 by creating a new data form that will travel with each captured media asset 410. The system can culminate data into the media data file 410 and organize it in a visual file that is part of the media file 410. The data can be presented to a user through a traditional display device along with the media 410 or can be viewed through a user control. The certification will be highlighted by certain colors and integrated with systematically collected data at time of capture and loaded into the appropriate location. A certified media asset can be signified as the media overlaid by a marker such as a barber pole, a "certified image" stamp, or a "certified by [image certifying authority]" stamp, a quick response (QR) code, a barcode, another marker or watermark discussed herein, or some combination thereof. The certified media of FIG. 4 includes an example of certified marker, a barber pole logo and a "certified by ImageKeeper" stamp.

A user seeing such a marker can be confident that a media certifying authority has certified the authenticity of the underlying digital media data 410, metadata 420, and/or sensor data. The media certification system 400 may be used to ensure that digital media data 410 is protected in an "original captured state." That state can be certified by the media capture system 400 and/or a third-party auditor system. That data can then be organized and/or secured (e.g., encrypted). The media certification system may store the media assets in network, cloud, or local area storage system like those shown in FIG. 5. The storage system may require a subscription before a user is able to interact with the data.

Embodiments of the secure digital media processing and document generation techniques may be extended to other third-party applications or services included as an SDK or API. For example, a user may share/post, via social networks and social media sites or mobile applications (e.g., Twitter, Facebook, Instagram, Pinterest, Myspace), a certified image/video/audio/media, in either a secure (e.g., encrypted) or unsecure format. A user may also have the ability to send certified images/video/media to another device/user via a messaging system (e.g., SMS, Apple iMessage, Google Hangouts, SnapChat, email, or another communication method) in a secured (e.g., encrypted) or unsecured manner.

Figure 5:
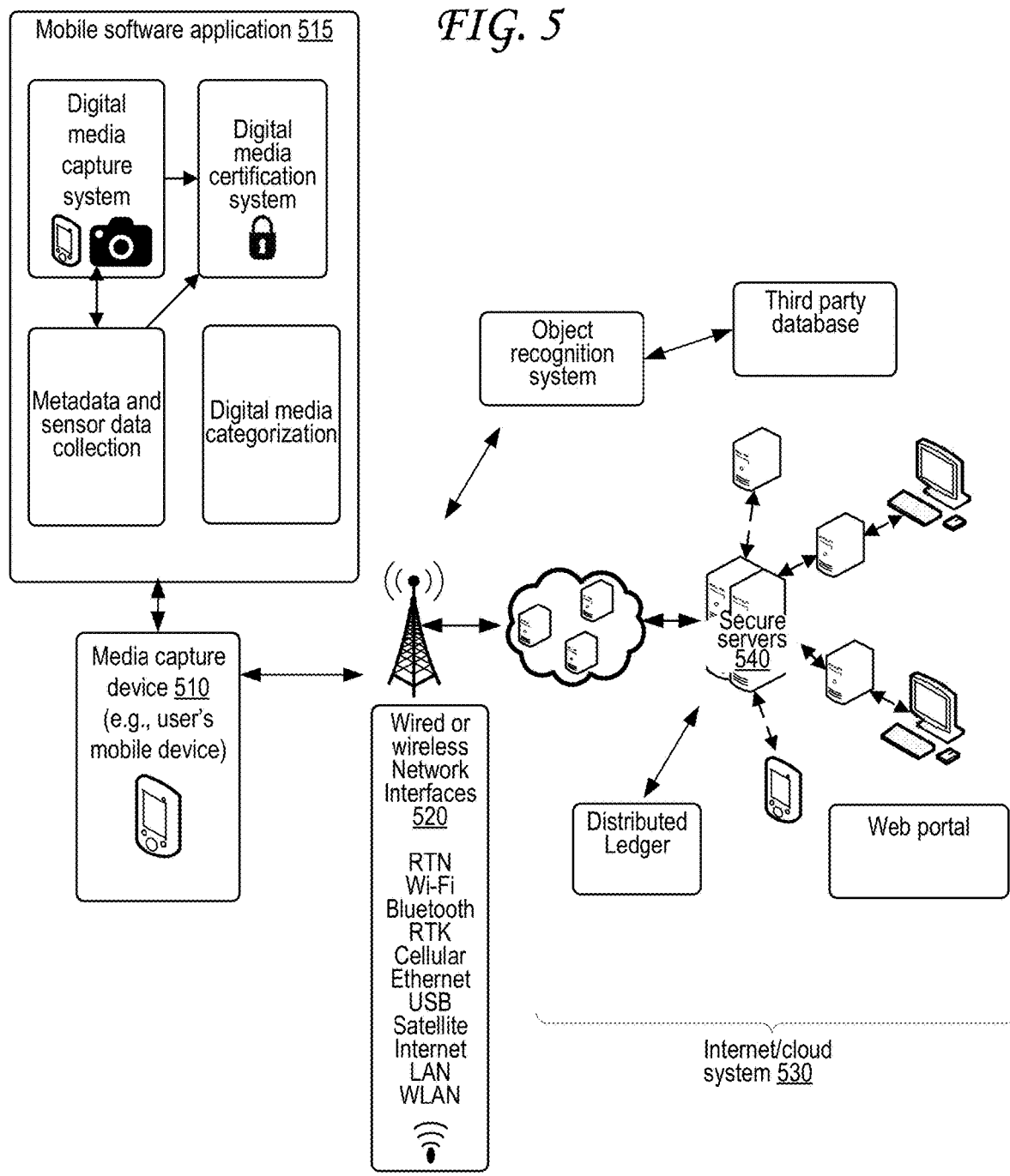
FIG. 5 illustrates a network architecture through which digital media may be captured, certified, uploaded to a server network, verified, synchronized, and distributed to clients.

FIG. 5 illustrates a network architecture through which digital media may be captured, certified, uploaded to a server network, verified, synchronized, and distributed to clients.

A mobile software application 515 is installed on a mobile user device 510, such as a cell phone. The mobile application 515 may utilize the digital media capture system of the mobile device 510 to capture the digital media asset, sensor data, and metadata of the digital media asset. The digital media asset may include one or more image(s), video(s), sensor data, or a combination thereof. The digital media capture device 510 may be any type of computing device 1400, such as a user mobile device, tablet, computer web camera, Alexa, Siri, a drone or UAV, a dash camera of a vehicle, a body camera, a surveillance camera, medical imaging systems, dental cameras, satellite phone/camera, a wearable device, a phone another type of device, or a combination thereof. The digital media certification system certifies the digital media captured by the mobile device 510 via the mobile insurance application 515. The digital media and/or sensor data may be categorized by the categorization system based on type of media, time, location, other metadata associated with capture of the digital media, or some combination thereof. The media captured by the media capture device 510 may be automatically grouped and/or categorized into groups or categories by type, ID, time, address or GPS location, or other properties by the media capture device 510 and/or by the server system 540. The media captured by the media capture device 510 may alternately or additionally be manually grouped and/or categorized into group and/or categories by the user using the GUI. Audio and video capture may be transcribed automatically or by user selection and transferred to the secure cloud server 540.

The data is then autonomously sent to the internet/cloud system 530 where the digital data is filed, stored and accessed through the web in a systematic or serialized format constant with image identification formed with the media capture device 510 (as seen on the right side of FIG. 5). Various information related to the multiple user such as a family or business and the policies may be stored in user cloud storage associated with the server system 540, or local storage associated with the mobile device 510. The user can access multiple policies purchased in the mobile application 515 and switch between policies to access. Past insurance claims, history of payments, certificate of renewals, warranty for home device purchased, terms of the insurance, and past quotes may be stored in the cloud.

This data can be transferred over a wired or a wireless connection. Such connections may include cellular networks (e.g., 3G, 4G, LTE, or 5G), W-Fi, local area networks (LAN), wireless local area networks (WLAN), satellite networks, the Internet, any other wired and/or wireless network interfaces 520 discussed herein, or a combination thereof. In some embodiments, the media capture device 510 can first synchronize its image and/or sensor data with a second device. For example, a camera device (e.g., a digital point-and-shoot camera) may first be required to synchronize its data with a user device such as a smartphone or wearable device, which can then form a connection to the internet/cloud system 530.

The internet/cloud system 530 can include one or more server systems 540, which may be connected to each other. In one embodiment, this internet/cloud system 530 is a wireless multiplexed system for securely storing digital data to and from mobile digital devices. In another embodiment, the digital data (e.g., images, reports) are securely held in one central place, either by a hardware memory device, server, or a data center. In another embodiment, the digital data is stored in the distributed ledger such as blockchain. The authenticated certified media, its sensor data, metadata, as well as their encrypted hash values may be manually or automatically transferred to a blockchain system to ensure that the media and the related data are unaltered even if multiple parties have access to the media. The secure servers 540 may receive the public key transmitted by the certification system and use the public key to verify that the certified digital media data is authentic and unaltered.

Once the data is in the internet/cloud system 530, the data may be accessible through a web portal. This web portal may include image-editing tools, worldwide access, and collaboration mechanisms available to other relevant individuals. Security, digital signature, watermarking, encryption physical access, password credentials area can be utilized throughout the system. Original digital data can be confirmed, saved and protected though various technologies and system controls. The user of the mobile application 515 who seeks to be insured may collaborate remotely in real-time with an appraiser, underwriter, an adjuster, or any other relevant individuals involved in the insurance process using a web portal. The web portal may be a website hosted at the cloud server system 540 or hosted elsewhere on a host server or directly in a data center. The web portal may provide access to media assets to third parties who are involved in the insurance and the claim process. For example, the user may hold and aim the camera towards the property to be insured and the appraiser, underwriter, or an adjuster may operate the portal by clicking to capture the digital media asset remotely. In another example, the web portal may assist in recording a statement from the user or other relevant individuals, such as a witness, in a similar manner. The web portal may further provide collaboration between the relevant individuals using different mobile devices 510 with the mobile application 515 installed in the devices 510 by facilitating streaming videos or web meeting communication between the devices 510. Those individuals may simultaneously share images, video, audio, or any other digital media asset via the mobile application 515 or the web portal. The certified media asset collaboration will be recorded and logged in the cloud system with its metadata such that the record will be recalled in the future. This creates a chain of custody from the instant the media is captured and assures the media is authentic and certified.

Object recognition system may be utilized by the mobile insurance system to evaluate digital media obtained from the digital media capture system. In some embodiments, third-party database containing information about the insured property or other similar properties may be utilized in order to evaluate condition, extent of the damage, and value of the property.

Figure 6:
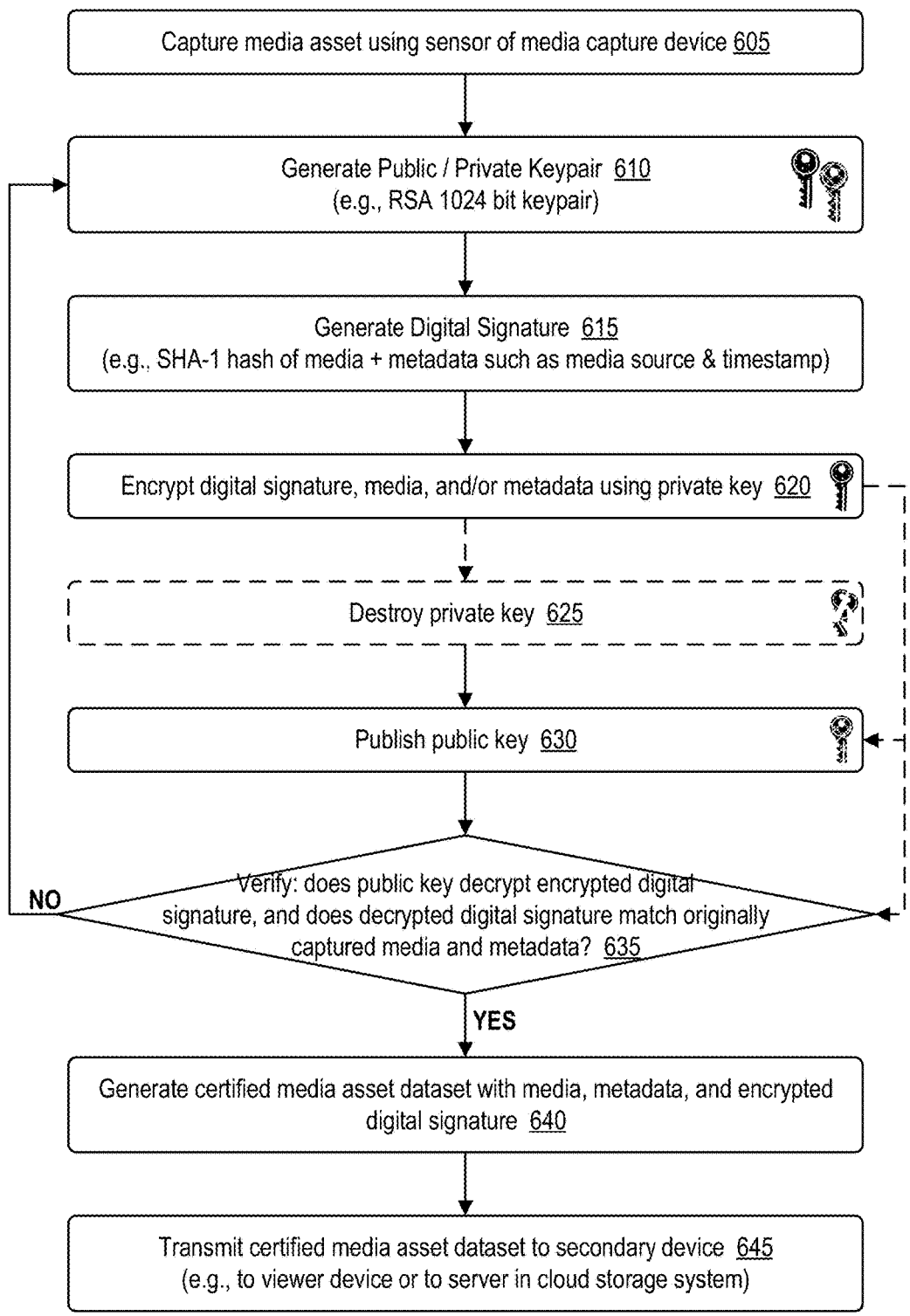
FIG. 6 is a flow diagram illustrating techniques for media and metadata certification.

FIG. 6 is a flow diagram illustrating techniques for media and metadata certification. The processes 600 of FIG. 6 may be performed by the media capture device 510, the internet/cloud system 530, or some combination thereof.

At step 605, a media asset is captured by a sensor of a digital media capture device 510, optionally with its metadata as well. The metadata may include, for example, latitude and longitude coordinates from a GNSS receiver or other positioning receiver, an identification of the media capture device 510, a timestamp identifying date and time of capture, an altitude at capture, a heading at capture, an inclination at capture, a yaw at capture, a roll at capture, pitch at capture, a watermark, an annotation, any other data that might be found in image EXIF metadata, elevation or altitude, velocity at capture, path, speed, direction, distance, weather conditions, barometer reading & change, dew point, humidity, sun angle, temperature, compass heading, media certification status, annotation certification status, incident note certifications status, incident report certification status, event number, time, date, time zone, title, media type (IR, multi-spectrum, lidar, UV, 2-dimensionality, 3-dimensionality), wind speed, wind direction, radar data, cloud coverage, visibility, flood data, any other metadata discussed herein, or combinations thereof.

At step 610, an asymmetric public key infrastructure (PKI) key pair—with a private key and a corresponding public key—is generated by the media capture device 510 of step 605 or by server 540. In some cases, the keys of the key pair may be RSA encrypted. Other types of asymmetric keys may be used.

At step 615, a digital signature is computed by generating a hash digest—optionally using a secure hash algorithm such as SHA-0, SHA-1, SHA-2, or SHA-3—of the captured media, and optionally of the metadata as well. At step 620, the digital signature is encrypted with the private key. The media and/or metadata may also be encrypted using the private key. The private key is optionally destroyed at step 625, or may simply never be written to non-volatile memory in the first place.

At step 630, the public key is published, either by sending it to the servers 540, to an authentication server such as a certificate authority, or by otherwise sending it for publication in another publicly accessible and trusted network location. At step 635, verification as to the authenticity of the media and metadata may occur by decrypting the encrypted digital signature using the public key before or after publication at step 630, and verifying whether or not the hash digest stored as part of the decrypted digital signature matches a newly generated hash digest of the media. If the new hash matches the hash decrypted using the public key, then verification is successful, and the media asset has not been modified since capture (or at least since certification). If the new hash does not match the hash decrypted using the public key, then verification is unsuccessful, and the media asset has been modified since capture (or at least since certification). The same can be done using the metadata if a hash digest of the metadata is included in the digital signature. The verification as to the authenticity of the media and metadata at step 635 may also include decrypting the media asset and/or the metadata itself, if either or both were encrypted at step 620. This verification may occur at the digital media capture device 510—though it may instead or additionally be performed at the server 540, for example before the server indexes the media as part of a cloud storage system accessible by client devices.

Once the authentication of step 635 succeeds, a certified media dataset is generated by bundling the media, metadata, and the encrypted digital signature, for example in a zip file or other compressed archive file. The public key may also be bundled with them, though additional security may be provided by publishing it elsewhere to a trusted authentication server. At step 645, the certified media dataset (and optionally the public key) is transmitted to a secondary device, such as a server 540 or a viewer device (i.e., a client device).

In some cases, additional data besides the media asset and associated metadata may also be certified, either or separately from the media asset or together with the certification of the media asset. If the additional data is certified together with the media asset, the hash and digital signatures at step 615 may be hashes of the media asset as well as the additional data, thereby certifying the media asset along with the additional data. If the additional data is certified separately from the media asset, the entire process 600 may be repeated, with the additional data treated as a media asset. Additional data may include alterations or annotations to a media asset, or at least a subset of a report that is generated based on the media asset, or at least a subset of a report that is generated to include the media asset. Metadata corresponding to the additional data in some cases identifying one or more author(s) of the additional data and/or one or more devices on which the additional data was generated and/or certified, and/or from which the additional data was submitted to the server(s) 540. In some cases, a certain media asset can be associated with multiple additional data items, such as multiple notes, annotations, and/or reports by different authors, the same authors, or some combination thereof.

In other words, the operations 600 of FIG. 6 illustrate data integrity precautions that can be taken. For example, all data (e.g., media asset and/or additional data and/or metadata) can, in some embodiments, be secured in a local database with a globally unique identifier to ensure its integrity. The asset's security and integrity can be ensured via a Digital Signature that is made up of a Secure Hash Algorithm (SHA) digest, the time that the asset was captured and the device 510 of origin. This allows the mobile app or server to detect changes due to storage or transmission errors as well as any attempt to manipulate or change the content of the asset. The Digital Signature can be encrypted with a public/private key-pair that is generated uniquely for that asset by the media capture device 510. The private key can be destroyed by the media capture device 510 and/or never written to a disk or stored in a memory of the media capture device 510 or any other device; as such, this ensures that the asset cannot be re-signed and cannot be changed without those changes being detectable.

More specifically, media asset data, such as image, video, audio, 3D distance measurements, or other sensor data are captured by a camera, microphone, and/or other sensors integrated with the digital media capture device 510 and/or sensors connected to the digital media capture device 510 in a wired or wireless manner. The digital media capture device 510 also generates and/or extracts metadata (e.g., EXIF metadata) corresponding to this captured media asset, for example identifying the digital media capture device 510, a timestamp of capture, a date of capture, an author or owner of the digital media capture device 510, and any other metadata. A digital signature is generated by generating a hash of both the captured media and at least some of this metadata. For example, the digital signature may be a hash of the captured media, the timestamp, and an identifier of the digital media capture device 510 that captured the media. The hash may be computed using a secure hash algorithm (SHA), such as SHA-0, SHA-1, SHA-2, or SHA-3. The digital media capture device 510 and/or a second device that receives the media asset from the digital media capture device 510 may then generate a public and private key pair using a public key infrastructure (PKI), where the keys may be for example RSA 1024 or 2048 bit keys. The private key is used to encrypt the digital signature, and may then be deleted, erased, and/or destroyed, in some cases via overwriting for more security. The certified media asset—meaning the media asset, the encrypted digital signature, and the (optionally encrypted) metadata—are uploaded to the cloud severs, in some cases along with the public key, optionally securely via HTTPS or another secure network transfer protocol. The public key may be uploaded to the same cloud server(s) or to a different system, such as a certificate authority (CA) server. The media asset and its metadata are now certified. Any server or client can retrieve the public key from the cloud server system 540 or CA server and decrypt the encrypted digital signature to verify that it matches a new hash generated using media asset and/or metadata at a later time, thereby verifying that the media asset and metadata have not been changed since certification. The same certification process may be used for additional data based on the media asset, such as annotations, notes, and reports. In some cases, such a verification check is performed at the media capture device 510 or second device before the media asset and metadata and encrypted digital signature and public key are sent by the media capture device 510 or second device to the server(s). In some cases, such a verification check is performed at the server after receipt of the certified media asset.

Metadata may include, for example, time, location, media capture, orientation, media size, resolution, frame size, elevations, centimeter 3D GPS position, digital media capture device speed, heading, or some combination thereof.

Figure 7:
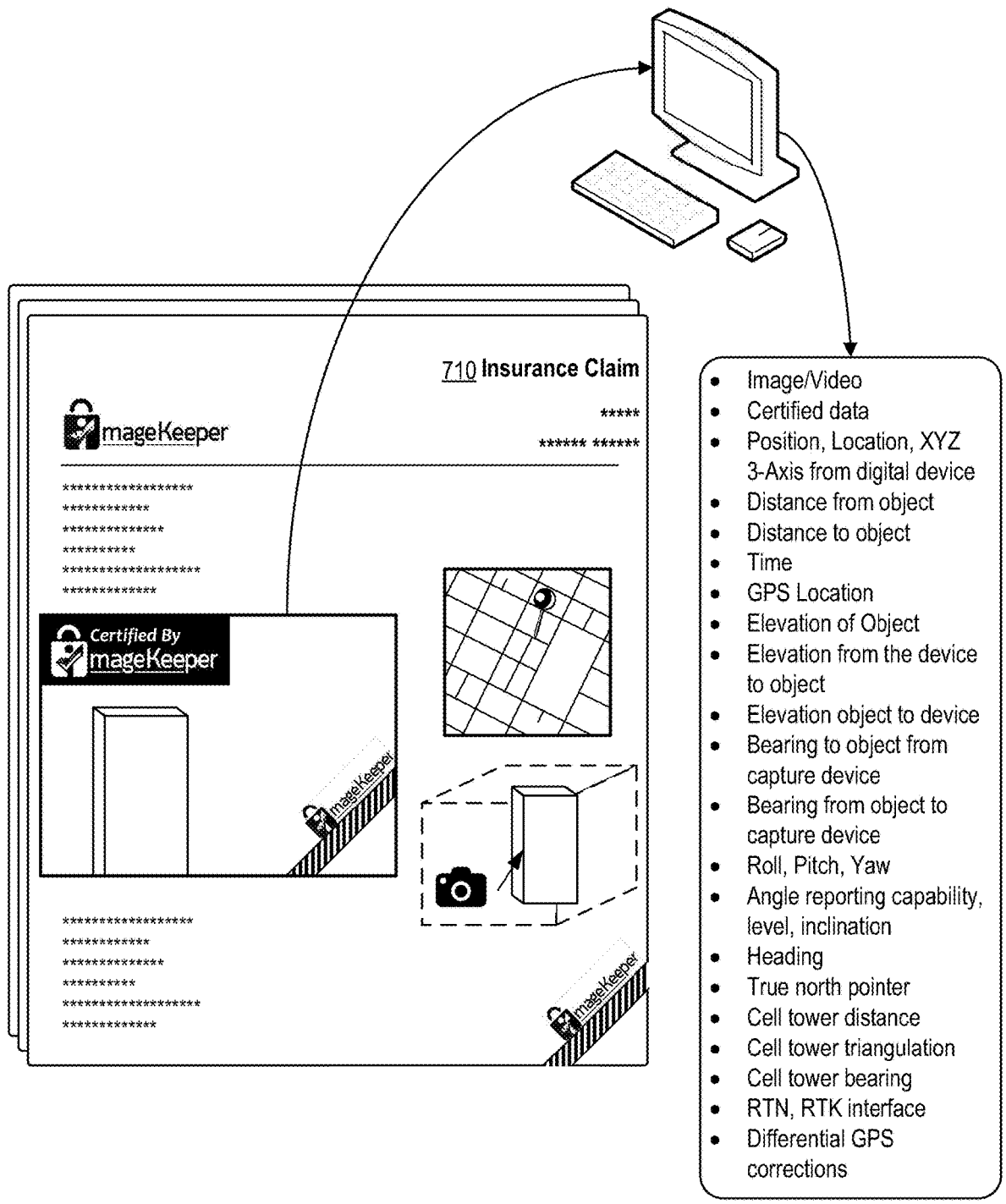
FIG. 7 illustrates an exemplary web portal display for viewing a document with an integrated certified image.

FIG. 7 illustrates an exemplary web portal display for viewing a document with an integrated certified image.

The web portal may be used to view user submitted forms to receive a quote, insurance claim document, or any other document submitted via the mobile insurance application 515. The document—here, an insurance claim document 710—may be a digital or physical document. The document can include a certified digital media, description of the digital media, or the insurance claim. This description of the digital media can include information such as an identification and/or contact information of the user who took the certified photo using the image capture device 510 and/or who wrote the description of the digital media or event, a location of the property or event, and a brief textual or graphical description of the property or event. The digital data organization process of the incident reporting system may be controlled manually by a user or automatically by computer hardware/software control processes. The web portal may be accessed through the mobile software application 515 as well as through a network page, such as a webpage accessible through the Internet.

FIG. 8 illustrates a document including two certified digital media assets corresponding to different capture times.

The document of FIG. 8 is an insurance claim document, and includes two certified images—a first certified image 805 and a second certified image 810—that are certified via the process 600 of FIG. 6. The first certified image 805 was captured on Jan. 6, 2019, as identified in the document and as determined from certified metadata of the first certified image 805. The second certified image 810 was captured on Mar. 20, 2020 (after the capture of the first certified image), as identified in the document and as determined from certified metadata of the second certified image 810.

The first certified image 805 is captured before the second certified image is captured 810, and depicts an object—a building—that is undamaged. The second certified image 810 is captured after the first certified image 805 is captured, and depicts the same object as the first certified image 805 does—a building—that is damaged. In some cases, the first certified image 805 and the second certified image 810 may be captured by the same media capture device 510. The media capture device 510 may be, for example user's mobile device 510 of a user associated with an insurance policy associated with the object—the building—depicted in the first certified image 805 and in the second certified image 810. The media capture device 510 may alternately be associated with an insurance company or agent associated with the insurance policy associated with the object. In some cases, the first certified image 805 and the second certified image 810 may be captured by different media capture devices 510.

In some cases, the first certified image 805 may be an image that is captured before the insurance policy is generated, selected, identified, activated, put into effect, used for an insurance claim, or some combination thereof. For example, the user may capture one or more images of an object—here, the building—certify the one or more images (which now include the first certified image 805), and send the one or more certified images to an insurance company so that the insurance company can identify the condition that the object is in at the time of capture of the first certified image 805. The time of capture of the first certified image 805 may be before the insurance policy associated with the object is generated, selected, identified, activated, put into effect, used for an insurance claim, or some combination thereof.

In some cases, the second certified image 810 may be an image that is captured after the insurance policy is generated, selected, identified, activated, put into effect, or some combination thereof. In some cases, the second certified image 810 is specifically captured in order to file an insurance claim, such as when the object that is depicted in the first certified image 805 and that is now associated with an insurance policy—here, the building—has incurred some damage. In FIG. 8, the building is illustrated as including damage—a crack—as depicted in the second certified image 810, where the crack is missing in the first certified image 805. For example, once the object incurs damage that the user wishes to file an insurance claim over, the user may capture one or more new images of the object that is depicted in the first certified image 805, certify the one or more new images (which now include the second certified image 810), and send the one or more new certified images to an insurance company so that the insurance company can identify the condition that the object is in at the time of capture of the second certified image 810. The time of capture of the second certified image 810 may be after the insurance policy associated with the object is generated, selected, identified, activated, put into effect, or some combination thereof, and may be after damage has been incurred to the object over which a user wishes to file an insurance claim associated with the insurance policy. The object may be depicted in both the first certified image 805 and the second certified image 810. The damage incurred by the object may be depicted in the second certified image 810, but not the first certified image 805.

In reviewing an insurance claim, an insurance company might typically wish to verify that the insurance claim is not fraudulent. Here, the server system 540 may automatically verify that the insurance claim is not fraudulent by automatically verifying a number of properties of the first certified image 805, the second certified image 810, metadata associated with capture of the first certified image 805, metadata associated with capture of the second certified image 810, sensor data associated with capture of the first certified image 805 and captured by sensors of the media capture device 510 that captured the first certified image 805, sensor data associated with capture of the second certified image 810 and captured by sensors of the media capture device 510 that captured the second certified image 810, or some combination thereof.

For instance, the server system 540 may use an image recognition algorithm to identify that the object associated with the insurance policy is the object depicted in the both the first certified image 805 and the second certified image 810. To do so, the image recognition algorithm may identify features of the object as depicted in first certified image 805, such as various corners and edges and colors of the building, and identify that the features match features found in the second certified image 810. The image recognition algorithm may retrieve another image of the type of object insured from a database or other storage repository, for example by querying an image of a building or of the specific building, identifying features of the object as depicted in the image from the search, and then identify that the features match features found in the first certified image 805 and the second certified image 810. This verification process prevents fraudulent activity in an automated technological manner in that it prevents a malicious user from capturing images of two different objects in the two images, and trying to pass them off as the same object.

The server system 540 may use the image recognition algorithm to verify that the damage incurred by the object that is depicted in the second certified image 810—here, a crack in the building—is not depicted in the first certified image 805. This verification process prevents fraudulent activity in an automated technological manner in that it prevents a malicious user from trying to file an insurance claim on damage that was already present in the object when the user was filing the insurance policy.

The server system 540 may use the image recognition algorithm to verify that the damage incurred by the object that is depicted in the second certified image 810—here, a crack in the building—is not depicted in another certified image that has been received by the insurance company and/or that may be associated with a previous and/or different insurance claim. This verification process prevents fraudulent activity in an automated technological manner in that it prevents a malicious user from trying to file multiple insurance claims on the same damage.

The server system 540 may also verify, based on certified metadata associated with the first certified image 805 and the second certified image 810, that the location at which the first certified image 805 was captured matches the location at which the second certified image 810 was captured, at least within a predetermined radius or distance to accommodate for slight variations in media capture vantage point and variations in positioning functionality. If the insured object is a building or other stationary object, the locations of capture of these images should be the same, at least within a margin of error of a predetermined range or distance, which may for instance be between 0.1 miles and 10 miles, or between 0.1 kilometers and 10 kilometers. The server system 540 may also retrieve a location of the object from a database or other storage repository, such as one associated with a land title deed, and verify that the retrieved location of the object matches the locations of capture of the first certified image 805 and the second certified image 810, at least within a margin of error of the predetermined range or distance. This verification process prevents fraudulent activity in an automated technological manner in that it prevents a malicious user from capturing images of two different objects in the two images if the objects are in different places, even if they look identical, and trying to pass the images off as the same object.

The server system 540 may also verify, based on certified metadata associated with the first certified image 805 and the second certified image 810, that the time of capture of the first certified image 805 is before the time of capture of the second certified image 810. In other words, the server system 540 may also verify that the time of capture of the second certified image 810 is after the time of capture of the first certified image 805. In some cases, the server system 540 may verify that the time of capture of the first certified image 805 is also before one or more times and/or dates associated with the insurance policy on the object being generated, selected, identified, activated, put into effect, used for an insurance claim, or some combination thereof. In some cases, the server system 540 may verify that the time of capture of the second certified image 810 is also after one or more times and/or dates associated with the insurance policy on the object being generated, selected, identified, activated, put into effect, or some combination thereof. This verification process prevents fraudulent activity in an automated technological manner in that it ensures that images are captured when the user states that they are.

The server system 540 may also verify, based on certified sensor data associated with capture of the first certified image 805 and certified sensor data associated with capture of the second certified image 810, that certified sensor data associated with capture of the first certified image 805 matches certified sensor data associated with capture of the second certified image 810. For example, the sensor data associate with both certified images may include data captured by a RADAR sensor, a LIDAR sensor, an infrared sensor, a microphone, or some combination thereof. This verification process prevents fraudulent activity in an automated technological manner in that it ensures that the same object is depicted in both the first certified image 805 and the second certified image 810 based on additional sensor data that could catch discrepancies that might not be caught otherwise through the images or other metadata alone.

The first certified image 805 may be received by the server system 540 (or a separate server system 540) and stored there at or shortly after capture; that is, before the insurance policy on the object is used for an insurance claim, and before, during, or shortly after the insurance policy on the object is generated, selected, identified, activated, put into effect, or some combination thereof. Thus, FIG. 8 illustrates the first certified image 805 as coming from a server system 820. The second certified image 810 may be received after receipt of the first certified image 805, and therefore may be received from the media capture device 510, such as the mobile devices 830 illustrated in FIG. 8. However, in some cases, the first certified image 805 may be instead received from the media capture device 830. In some cases, the second certified image 810 may be instead received from the server system 820.

While the document of FIG. 8 includes two certified images 805 and 810, and various verification processes are discussed above with respect to the two certified images 805 and 810, other types of certified media may be used in the document and in the verification processes discussed above. For example, one or both of the certified images 805 and 810 may be replaced with or supplemented with other forms of media, such as additional images, videos, audio, LIDAR point clouds, RADAR point clouds, infrared images or other captures, other types of media discussed herein, or some combination thereof.

Figure 9:
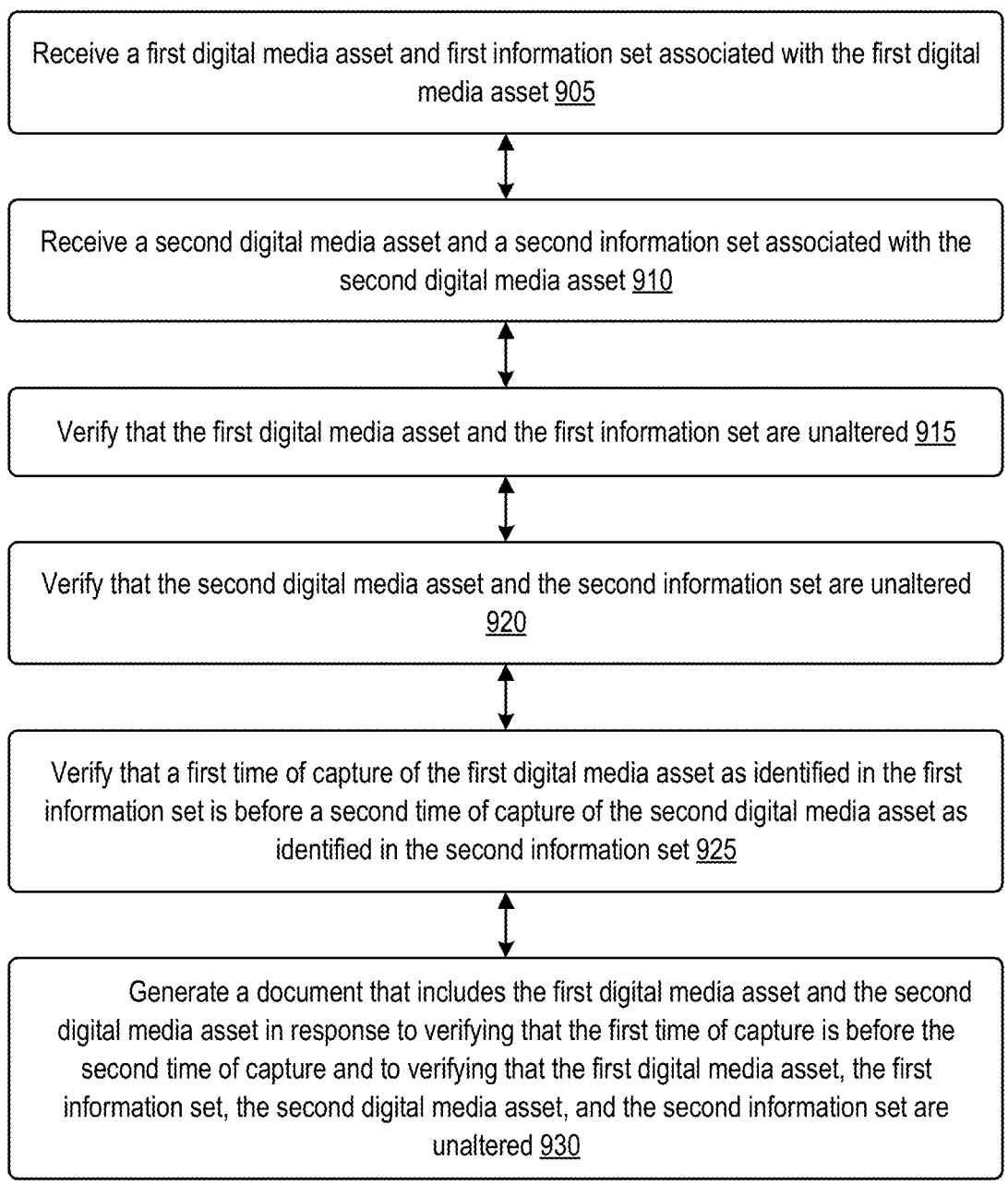
FIG. 9 illustrates operations for secure digital media processing.

FIG. 9 illustrates operations for secure digital media processing. The process 900 of FIG. 9 is performed by the secure server system 540 and/or another portion of the internet/cloud system 530 of FIG. 5.

At step 905, the server system 540 receives a first digital media asset and first information set associated with the first digital media asset. At step 910, the server system 540 receives a second digital media asset and a second information set associated with the second digital media asset.

At step 915, the server system 540 verifies that the first digital media asset and the first information set are unaltered. At step 920, the server system 540 verifies that the second digital media asset and the second information set are unaltered.

At step 925, the server system 540 verifies that a first time of capture of the first digital media asset as identified in the first information set is before a second time of capture of the second digital media asset as identified in the second information set.

At step 930, the server system 540 generates a document that includes the first digital media asset and the second digital media asset in response to verifying that the first time of capture is before the second time of capture and to verifying that the first digital media asset, the first information set, the second digital media asset, and the second information set are unaltered.

In some cases, the document produced in step 930 may be an insurance claim document such as the insurance claim document of FIG. 8. The verification steps 915-925 may be performed as discussed or substituted by any verification processes discussed with respect to FIG. 8.

Figure 10:
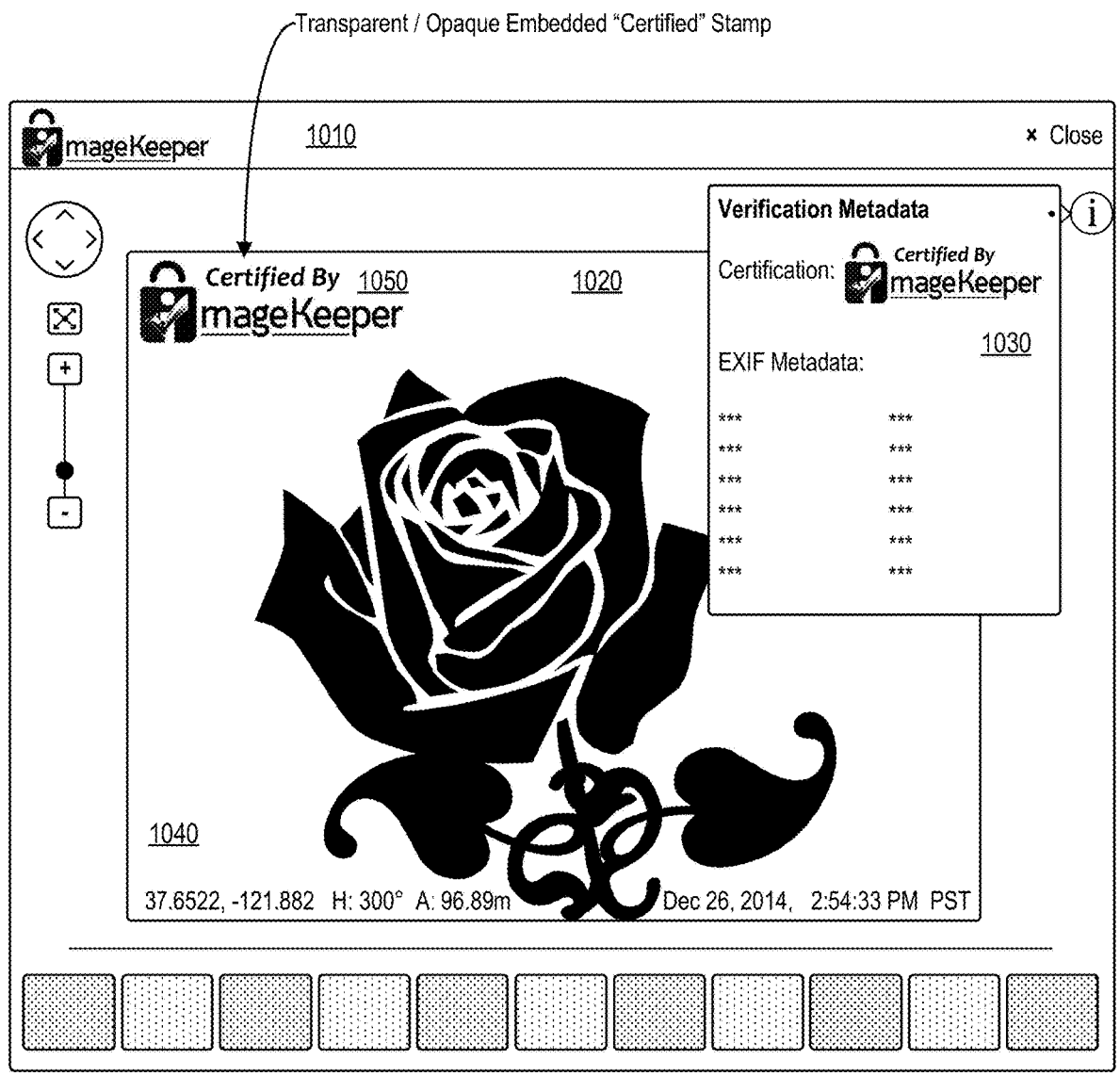
FIG. 10 illustrates an exemplary certified image within an exemplary image viewer application.

FIG. 10 illustrates an exemplary certified image within an exemplary image viewer application.

The exemplary image viewer application 1010 displays an image 1020 and shows a "certified image" stamp or "certified by [image certifying authority]" stamp graphic 1050 in the upper left corner of the image 1020, signifying that the image 1020 is a certified image and therefore is certified as authentic and unaltered. The exemplary image viewer 1010 also shows some image metadata along the bottom 140 of the image 1020 and additional metadata in a metadata viewing box 1030 on the right-hand side of the image 1020. This metadata is also certified as part of the certification process, and may in some cases also be marked with a "certified image" stamp or "certified by [image certifying authority]" stamp graphic itself to signify that it, too, is certified as authentic and unaltered.

Figure 11:
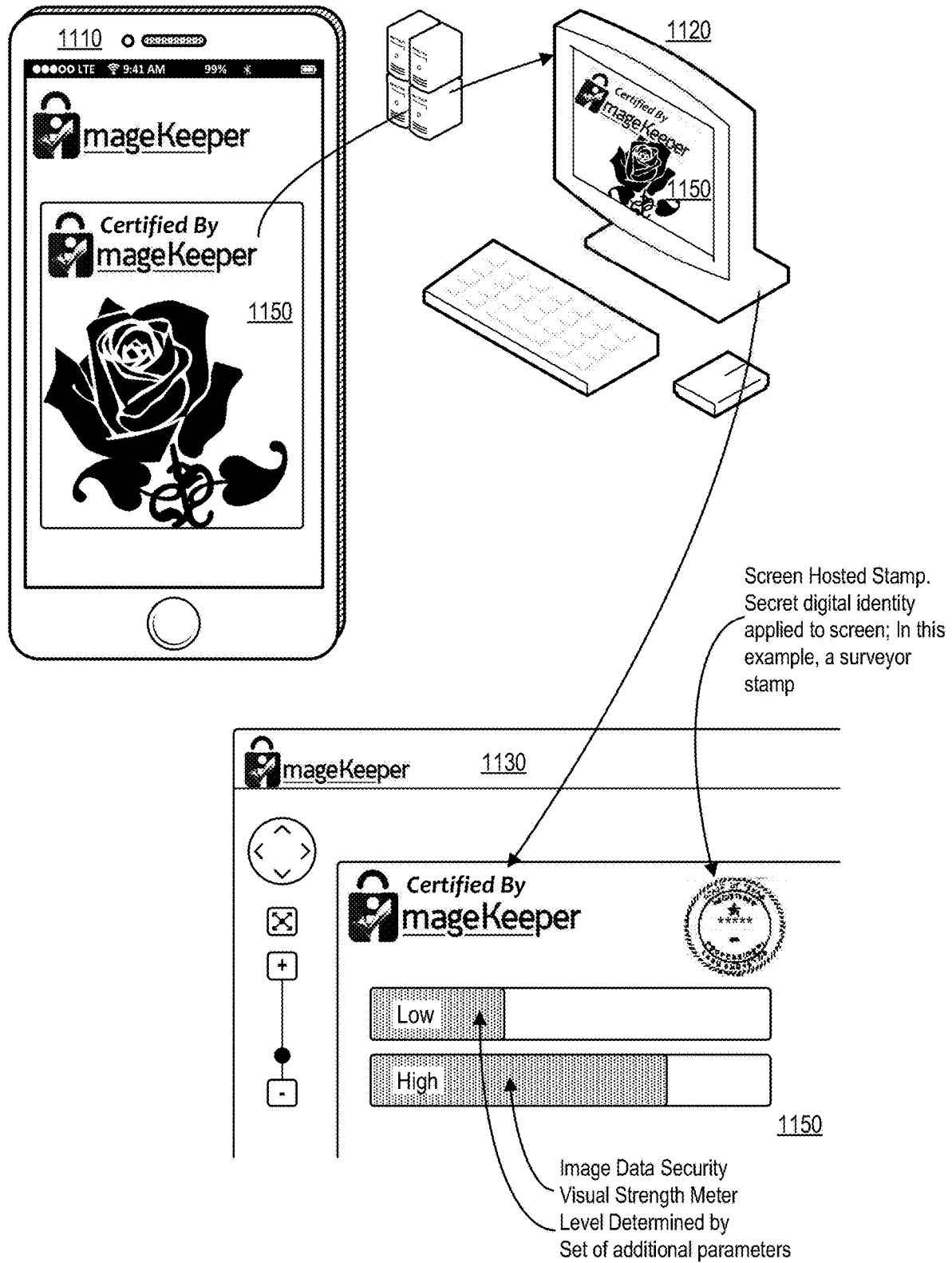
FIG. 11 illustrates capture of an image at a media capture device and transfer of the image upon its certification to a computing device at which the certified image is viewed.

FIG. 11 illustrates capture of an image at a media capture device and transfer of the image upon its certification to a computing device at which the certified image is viewed.

In particular, a media capture device 1110 captures an image 1150 and certifies the image 1150 upon capture. The certified image 1150 is transferred, optionally through the server(s) 540, to a viewer device 1120, which views the certified image 1150 in a viewer application 1130. The viewer application 1130 may display meters corresponding to image data security levels, for instance identifying a degree of confidence in the authenticity and unaltered nature of the certified image 1150.

Figure 12:
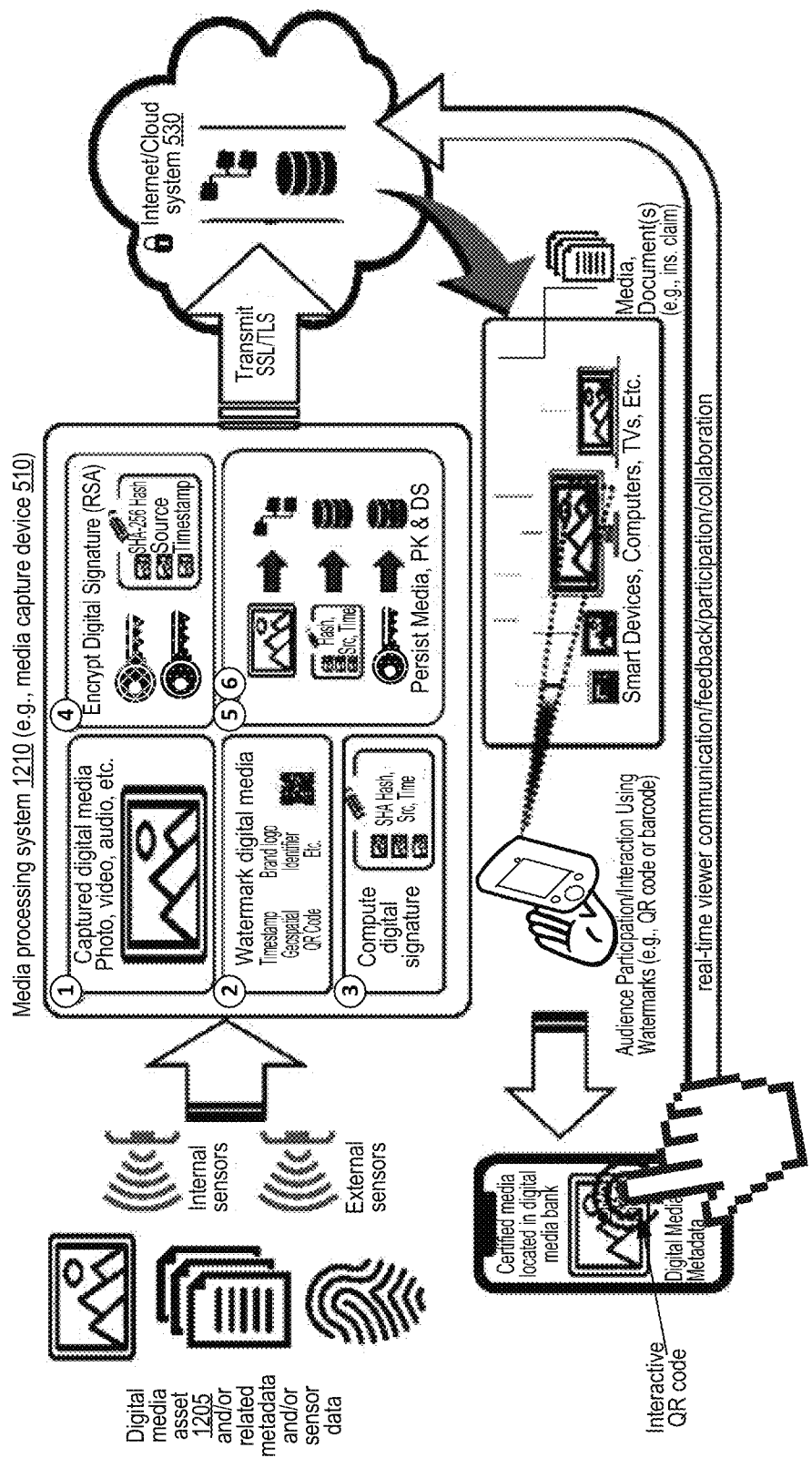
FIG. 12 is a flow diagram illustrating operations for capturing media, certifying the media, securely transferring the certified media, securely storing the certified media, and securely broadcasting the certified media.

FIG. 12 is a flow diagram illustrating operations for capturing media, certifying the media, securely transferring the certified media, securely storing the certified media, and securely broadcasting the certified media.

A digital media asset 1205 captured by a digital media capture device 510, such as an image captured by a camera, is received by the media processing system 1210, which may in some cases be the media capture device 510, the internet/cloud system 530, or some combination thereof. The digital media asset 1205 may be in the form of image data, audio data, video data, RADAR data, LIDAR data, SONAR data, SODAR data, sensor data from one or more other sensors, or some combination thereof. The media processing system may also receive metadata related to the digital media asset 1205. The metadata may include location, orientation, navigation attributes, orientation of the media capture device 510, time of the capture, date of capture, photographer, identity of the digital media capture device 510, owner of the digital media capture device 510, sensor data from one or more other sensors coupled to the digital media capture device 510, or some combination thereof.

When the digital media asset 1205 and its metadata are captured by the digital media capture device 510, the digital media asset 1205 and its metadata are automatically certified instantly at (or within a short time period after) the press of the camera's shutter button (as in FIG. 6) and transmitted by the digital media capture device 510 to the internet/cloud system 530 where the digital data is filed, stored, and accessed through the web in a systematic or serialized format. The system generates an information page based on the information associated with the digital media asset on a network location. The internet/cloud system 530 can include one or more server systems 540, which may be connected to each other. In some cases, this internet/cloud system 530 is a wireless multiplexed system for securely storing digital data to and from multiple mobile digital devices 510. In some cases, the digital data (e.g., images, reports) are securely held in one central place, either by a hardware memory device, server, or a data center.

The digital media asset 1205 is embedded with a glyph that encodes information pointing to the internet/cloud system 530. This glyph can be a quick response (QR) code, a barcode, Aztec code, brand logo, URL, or other identifier. The information pointing to the internet/loud system can encode or otherwise include a URL. The system then generates a modified digital media asset by overlaying the glyph on or over the digital media asset 1205.

Once the digital data is in the internet or cloud system, the digital media asset 1205 may be protected through a various technologies and system controls. Security, digital signature, watermarking, encryption physical access, password credentials area can be utilized throughout the system. Original digital data can be confirmed, saved and protected though various technologies and system controls. The system may generate a hash digest of the digital media asset and a unique key pair corresponding to the digital media asset. The unique key consists of a private key and a public key, in which the private key is used to encrypt both the hash digest and the metadata. The public key may be transmitted to a network server. The information pointing to the network location may require a passcode to access the digital data.

A content provider (e.g., the servers 540 or a device that retrieves the modified digital media dataset and/or information page from the media capture device 510) may broadcast the information regarding the digital media by displaying the media as well as the glyph associated with the media during its broadcast on a display device. The content provider may be television network, radio channel, newspaper, or magazine publisher. Viewers of the broadcast may request to access the digital media and its associated information by scanning the glyph from the broadcast with the viewer's device. This data can be transferred over a wired or a wireless connection or printed on photo, legal document, newspaper, magazine, or flyer. When requested to provide the digital media data, the system may generate a decrypted signature by decrypting the digital signature using the public key, generate a hash based on the digital media asset, and verify that the hash matches the decrypted signature.

In one embodiment, when a viewer of the broadcast requests this information, the viewer may be shown the information page corresponding to the digital media asset. In another embodiment, the viewer may be prompted to provide a passcode to access the information page containing the digital media asset and its metadata. The information page may include a certification that the digital media asset is unaltered based on the hash matching the decrypted signature.

Figure 13:
FIG. 13 illustrates a modified version of a digital media asset with an overlaid glyph.

FIG. 13 illustrates a modified version of a digital media asset with an overlaid glyph. The server system 540 generates the glyph 1320 to encode a URL and/or other information identifying a network location (e.g., URL) of an information page. The server system 540 generates the modified digital media asset by generating a glyph 1320 and overlaying the glyph 1320 on the digital media asset 1310, or by otherwise embedding the glyph 1320 into the digital media asset 1310. The certified image 1310 may also be modified by overlaying certain metadata 1330 over the image 1310.

The glyph 1320 is located on the bottom right of the certified image 1310 as a quick response (QR) Code 1320. A requesting device may interact with this image by scanning the QR Code 1320 with a camera or other scanner of the requesting device, such as a smart phone or tablet with a QR Code scanner. The requesting device may then decode the glyph to obtain the network location. The requesting device may go to the network location, for example in a browser, and request the information page from the servers 540. The servers 540 then provide the information page or media to the requesting device.

In some cases, the modified digital media asset 1310 may alternately or additionally include a hyperlinked text or region of the digital media asset, such that a user viewing the modified digital media asset on a device can click or tap the hyperlinked text or region to go to the network location (e.g., URL) of the information page. In some cases, the QR code may be the hyperlinked region of the modified digital media asset.

The viewer using the digital device with a QR code can determine how much access the content provider may be given to the viewer's device when providing the digital media. That is, a viewer or administrator may set permissions so that only certain requesting devices may be able to access the information page. For example, devices that have a passcode.

The secure digital media processing and document generation techniques discussed herein may be implemented in the general context of computer executable instructions via software located on and between a remotely operated user device (e.g., Smartphone, tablet, or other electronic device) with a computerized operating system. There may be multiple user devices interacting with a web portal, which may be local or may be geographically separated. The user devices may be remotely addressable with secure login, with or without password, biometric fingerprint, voice, retinal scan or encrypted log on web portal providing global internet access, either via fiber, radio frequency, satellite, or data linking with bi-directional, cloud system and or data center or location under user command.

The web portal and/or viewer device mobile application can include annotation tools, allowing for creation of charts and graphics with color annotation incorporating picture in picture, with image numbers associated with each image brought into the web portal workspace. In addition to annotation tools, any interface with all of the external data inputs, such as weather, news, Internet sites, other sensor data can be integrated into the workspace and integrated into the image work areas.

Figure 14:
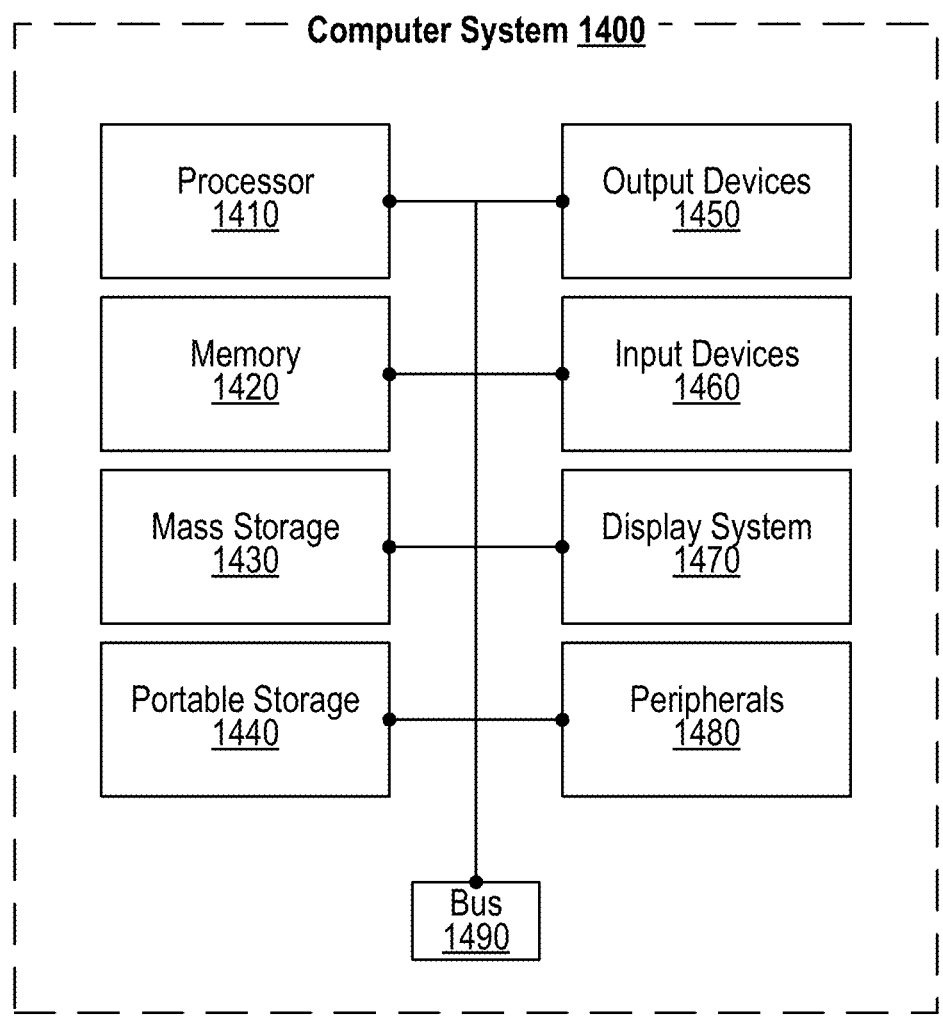
FIG. 14 is a block diagram of an exemplary computing device that may be used to implement some aspects of the technology.

FIG. 14 illustrates an exemplary computing system 1400 that may be used to implement some aspects of the technology. For example, any of the computing devices, computing systems, network devices, network systems, servers, and/or arrangements of circuitry described herein may include at least one computing system 1400, or may include at least one component of the computer system 1400 identified in FIG. 14. The computing system 1400 of FIG. 14 includes one or more processors 1410 and memory 1420. Each of the processor(s) 1410 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1410 may include one or more cores, either integrated onto a single chip or spread across multiple chips connected or coupled together. Memory 1420 stores, in part, instructions and data for execution by processor 1410. Memory 1420 can store the executable code when in operation. The system 1400 of FIG. 14 further includes a mass storage device 1430, portable storage medium drive(s) 1440, output devices 1450, user input devices 1460, a graphics display 1470, and peripheral devices 1480.

The components shown in FIG. 14 are depicted as being connected via a single bus 1490. However, the components may be connected through one or more data transport means. For example, processor unit 1410 and memory 1420 may be connected via a local microprocessor bus, and the mass storage device 1430, peripheral device(s) 1480, portable storage device 1440, and display system 1470 may be connected via one or more input/output (I/O) buses.

Mass storage device 1430, which may be implemented with a magnetic disk drive or an optical disk drive, is a non-volatile storage device for storing data and instructions for use by processor unit 1410. Mass storage device 1430 can store the system software for implementing some aspects of the subject technology for purposes of loading that software into memory 1420.

Portable storage device 1440 operates in conjunction with a portable non-volatile storage medium, such as a floppy disk, compact disk or Digital video disc, to input and output data and code to and from the computer system 1400 of FIG. 14. The system software for implementing aspects of the subject technology may be stored on such a portable medium and input to the computer system 1400 via the portable storage device 1440.

The memory 1420, mass storage device 1430, or portable storage 1440 may in some cases store sensitive information, such as transaction information, health information, or cryptographic keys, and may in some cases encrypt or decrypt such information with the aid of the processor 1410. The memory 1420, mass storage device 1430, or portable storage 1440 may in some cases store, at least in part, instructions, executable code, or other data for execution or processing by the processor 1410.

Output devices 1450 may include, for example, communication circuitry for outputting data through wired or wireless means, display circuitry for displaying data via a display screen, audio circuitry for outputting audio via headphones or a speaker, printer circuitry for printing data via a printer, transcription or some combination thereof. The display screen may be any type of display discussed with respect to the display system 1470. The printer may be inkjet, LaserJet, thermal, or some combination thereof. In some cases, the output device circuitry 1450 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1450 may include any ports, plugs, antennae, wired or wireless transmitters, wired or wireless transceivers, or any other components necessary for or usable to implement the communication types listed above, such as cellular Subscriber Identity Module (SIM) cards.

Input devices 1460 may include circuitry providing a portion of a user interface. Input devices 1460 may include an alpha-numeric keypad, such as a keyboard, for inputting alpha-numeric and other information, or a pointing device, such as a mouse, a trackball, stylus, or cursor direction keys. Input devices 1460 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1460 may include any ports, plugs, antennae, wired or wireless receivers, wired or wireless transceivers, or any other components necessary for or usable to implement the communication types listed above, such as cellular SIM cards.

Input devices 1460 may include receivers or transceivers used for positioning of the computing system 1400 as well. These may include any of the wired or wireless signal receivers or transceivers. For example, a location of the computing system 1400 can be determined based on signal strength of signals as received at the computing system 1400 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1400 such as a router, modem, switch, hub, bridge, gateway, or repeater. These may also include Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1460 may include receivers or transceivers corresponding to one or more of these GNSS systems.

Display system 1470 may include a liquid crystal display (LCD), a plasma display, an organic light-emitting diode (OLED) display, a low-temperature poly-silicon (LTPO) display, an electronic ink or "e-paper" display, a projector-based display, a holographic display, or another suitable display device. Display system 1470 receives textual and graphical information, and processes the information for output to the display device. The display system 1470 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1480 may include any type of computer support device to add additional functionality to the computer system. For example, peripheral device(s) 1480 may include one or more additional output devices of any of the types discussed with respect to output device 1450, one or more additional input devices of any of the types discussed with respect to input device 1460, one or more additional display systems of any of the types discussed with respect to display system 1470, one or more memories or mass storage devices or portable storage devices of any of the types discussed with respect to memory 1420 or mass storage 1430 or portable storage 1440, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTER-CARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1400 of FIG. 14 can include those typically found in computer systems that may be suitable for use with some aspects of the subject technology and represent a broad category of such computer components that are well known in the art. That said, the computer system 1400 of FIG. 14 can be customized and specialized for the purposes discussed herein and to carry out the various operations discussed herein, with specialized hardware components, specialized arrangements of hardware components, and/or specialized software. Thus, the computer system 1400 of FIG. 14 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1400 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1400 may also use a Basic Input/Output System (BIOS) or Unified Extensible Firmware Interface (UEFI) as a layer upon which the operating system(s) are run.

In some cases, the computer system 1400 may be part of a multi-computer system that uses multiple computer systems 1400, each for one or more specific tasks or purposes. For example, the multi-computer system may include multiple computer systems 1400 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1400 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1420, the mass storage 1430, the portable storage 1440, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L16), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1410 for execution. A bus 1490 carries the data to system RAM or another memory 1420, from which a processor 1410 retrieves and executes the instructions. The instructions received by system RAM or another memory 1420 can optionally be stored on a fixed disk (mass storage device 1430/portable storage 1440) either before or after execution by processor 1410. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1400 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for secure media processing, the method comprising:
   receiving a first digital media asset and first information set associated with the first digital media asset;
   receiving a second digital media asset and a second information set associated with the second digital media asset;
   receiving a characteristic of an object; and
   executing instructions stored in memory, wherein execution of the instructions by a processor causes the processor to:
   verify that the first digital media asset and the first information set are unaltered,
   verify that the second digital media asset and the second information set are unaltered,
   verify that a first time of capture of the first digital media asset as identified in the first information set is before a second time of capture of the second digital media asset as identified in the second information set,
   verify that the first digital media asset depicts the object and that the second digital media asset also depicts the object at least in part by recognizing the characteristic of the object in both the first digital media asset and the second digital media asset, and
   generate a document that includes the first digital media asset and the second digital media asset and a confirmation that the first digital media asset and the second digital media asset both depict the object in response to verifying that the first time of capture is before the second time of capture and to verifying that the first digital media asset, the first information set, the second digital media asset, and the second information set are unaltered.

2. The method of claim 1, wherein the second digital media asset and the second information set are received after receipt of the first digital media asset and the first information set.

3. The method of claim 1, wherein the first digital media asset and the first information set are received from a network server, and wherein the second digital media asset and the second information set are received from a mobile device.

4. The method of claim 1, further comprising transmitting the document.

5. The method of claim 1, further comprising storing the document on a server, wherein the document is accessible over a network to one or more synchronized client devices while the document is stored on the server.

6. The method of claim 1, wherein the document includes a confirmation that the first time of capture is before the second time of capture and a confirmation that the first digital media asset, the first information set, the second digital media asset, and the second information set are unaltered.

7. The method of claim 1, wherein executing the instructions by the processor causes the processor to further:
   verify that a first location of capture of the first digital media asset as identified in the first information set is within a distance of a second location of capture of the second digital media asset as identified in the second information set, wherein the document includes a confirmation that the first location of capture is within the distance of the second location of capture.

8. The method of claim 1, wherein verifying that the first digital media asset depicts the object and that the second digital media asset also depicts the object includes recognizing a visual feature of the object in both the first digital media asset and the second digital media asset.

9. The method of claim 1, wherein the first information set includes an encrypted hash of the first digital media asset, the encrypted hash generated by a media capture device that captured the first digital media asset, wherein verifying that the first digital media asset is unaltered includes:
   generating a decrypted hash of the first digital media asset by decrypting the encrypted hash of the first digital media asset using a first public key,
   generating a new hash of the first digital media asset using a hash algorithm, and
   identifying that the new hash of the first digital media asset matches the decrypted hash of the first digital media asset.

10. The method of claim 1, wherein the second information set includes an encrypted hash of the second digital media asset, the encrypted hash generated by a media capture device that captured the second digital media asset, wherein verifying that the second digital media asset is unaltered includes:
    generating a decrypted hash of the second digital media asset by decrypting the encrypted hash of the second digital media asset using a first public key,
    generating a new hash of the second digital media asset using a hash algorithm, and
    identifying that the new hash of the second digital media asset matches the decrypted hash of the second digital media asset.

11. The method of claim 1, wherein the first information set includes a first metadata associated with capture of the first digital media asset, and the second information set includes a second metadata associated with capture of the second digital media asset.

12. The method of claim 1, wherein the first information set includes a first sensor dataset associated with capture of the first digital media asset and captured by a first sensor of a first media capture device that captured the first digital media asset, and wherein the second information set includes a second sensor dataset associated with capture of the second digital media asset and captured by a second sensor of a second media capture device that captured the second digital media asset.

13. The method of claim 1, wherein the document is associated with an insurance claim.

14. A system for secure media processing, the system comprising:

a communication transceiver that receives a first digital media asset, a first information set associated with the first digital media asset, a second digital media asset, and a second information set associated with the second digital media asset;

a memory that stores instructions; and a processor that executes the instructions, wherein execution of the instructions by the processor causes the processor to:

receive a characteristic of an object, verify that the first digital media asset and the first information set are unaltered, verify that the second digital media asset and the second information set are unaltered, verify that a first time of capture of the first digital media asset as identified in the first information set is before a second time of capture of the second digital media asset as identified in the second information set, verify that the first digital media asset depicts the object and that the second digital media asset also depicts the object at least in part by recognizing the characteristic of the object in both the first digital media asset and the second digital media asset, and generate a document that includes the first digital media asset and the second digital media asset and a confirmation that the first digital media asset and the second digital media asset both depict the object in response to verifying that the first time of capture is before the second time of capture and to verifying that the first digital media asset, the first information set, the second digital media asset, and the second information set are unaltered.

15. The system of claim 14, wherein execution of the instructions by the processor causes the processor to further:

verify that a first location of capture of the first digital media asset as identified in the first information set is within a distance of a second location of capture of the second digital media asset as identified in the second information set, wherein the document includes a confirmation that the first location of capture is within the distance of the second location of capture.

16. The system of claim 14, wherein execution of the instructions by the processor causes the processor to further:

verify that the first digital media asset depicts the object and that the second digital media asset also depicts the object, wherein the document includes a confirmation that the first digital media asset and the second digital media asset both depict the object.

17. The system of claim 16, wherein verifying that the first digital media asset and the second digital media asset both depict the object by recognizing a visual feature of the object in both the first digital media asset and the second digital media asset.

18. A non-transitory computer readable storage medium, having embodied thereon a program executable by a processor to perform a method for secure media processing, the method comprising:

receiving a characteristic of an object;

receiving a first digital media asset and first information set associated with the first digital media asset;

receiving a second digital media asset and a second information set associated with the second digital media asset;

verifying that the first digital media asset and the first information set are unaltered;

verifying that the second digital media asset and the second information set are unaltered;

verifying that a first time of capture of the first digital media asset as identified in the first information set is before a second time of capture of the second digital media asset as identified in the second information set;

verifying that the first digital media asset depicts the object and that the second digital media asset also depicts the object at least in part by recognizing the characteristic of the object in both the first digital media asset and the second digital media asset; and generating a document that includes the first digital media asset and the second digital media asset and a confirmation that the first digital media asset and the second digital media asset both depict the object in response to verifying that the first time of capture is before the second time of capture and to verifying that the first digital media asset, the first information set, the second digital media asset, and the second information set are unaltered.

* * * * *